United States Patent
Tiwari et al.

(10) Patent No.: US 11,012,461 B2
(45) Date of Patent: May 18, 2021

(54) NETWORK DEVICE VULNERABILITY PREDICTION

(71) Applicant: Accenture Global Solutions Limited, Dublin (IE)

(72) Inventors: Sanjay Tiwari, Bangalore (IN); Gaurav Khanduri, Karnataka (IN); Chandrasekarapuram Venkatesh Gangadharan, Mumbai (IN); Surya Kumar Venkata Gangadhara Idumudi, Chennai (IN); Nithyanandan Periasamy Dhanapal, Bangalore (IN)

(73) Assignee: ACCENTURE GLOBAL SOLUTIONS LIMITED, Dublin (IE)

(*) Notice: Subject to any disclaimer, the term of this patent is extended or adjusted under 35 U.S.C. 154(b) by 60 days.

(21) Appl. No.: 15/787,055

(22) Filed: Oct. 18, 2017

(65) Prior Publication Data

US 2018/0124097 A1 May 3, 2018

(30) Foreign Application Priority Data

Oct. 27, 2016 (IN) .............................. 201641036862

(51) Int. Cl.
    *H04L 29/06* (2006.01)

(52) U.S. Cl.
    CPC ...... *H04L 63/1433* (2013.01); *H04L 63/1425* (2013.01)

(58) Field of Classification Search
    CPC ............... H04L 63/1433; H04L 41/145; H04L 41/0686; H04L 41/5038; H04L 43/10; H04L 63/1425; G06F 11/008; G06F 11/22; G06F 11/2252
    USPC .............................................. 726/25; 710/73
    See application file for complete search history.

(56) References Cited

U.S. PATENT DOCUMENTS

| | | | |
|---|---|---|---|
| 6,675,129 B1* | 1/2004 | Gambon ................ | G06Q 30/02 700/109 |
| 6,697,894 B1* | 2/2004 | Mitchell ................. | G06F 1/163 361/679.4 |
| 7,225,250 B1 | 5/2007 | Harrop | |
| 7,363,528 B2 | 4/2008 | Chan et al. | |
| 8,230,268 B2 | 7/2012 | Nemecek et al. | |
| 8,533,537 B2 | 9/2013 | Nemecek et al. | |
| 8,751,421 B2* | 6/2014 | Anderson .......... | G05B 23/0229 706/12 |

(Continued)

FOREIGN PATENT DOCUMENTS

| | | |
|---|---|---|
| JP | 2016173782 | 9/2016 |
| WO | WO 97/24839 | 7/1997 |
| WO | WO 2013/16341 A1 | 10/2013 |

OTHER PUBLICATIONS

Patrick Morrison, et al., Challenges with Applying Vulnerability Prediction Models, HotSoS '15, Apr. 21-22, 2015, Urbana, IL, USA, Copyright 2015 ACM 978-1-4503-3376-4/15/04, Apr. 2015, pp. 1-9.*

(Continued)

*Primary Examiner* — Jeffery L Williams
(74) *Attorney, Agent, or Firm* — Brinks Gilson & Lione

(57) ABSTRACT

The vulnerability of network devices may be predicted by performing a survival analysis on big data. A prediction algorithm may be built by considering historical data from heterogeneous data sources. The operating state of the network devices on a network may be predicted. The services potentially affected by a predicted outage may be determined and displayed. Alternatively or in addition, the number of clients potentially affected by a predicted outage may be determined and displayed.

20 Claims, 22 Drawing Sheets

(56) References Cited

U.S. PATENT DOCUMENTS

| | | | | |
|---|---|---|---|---|
| 9,158,035 B2* | 10/2015 | Dam | ............... | G01W 1/00 |
| 9,355,010 B2 | 5/2016 | Gao | | |
| 9,813,402 B1* | 11/2017 | Chen | ............... | G06F 21/31 |
| 2010/0269052 A1* | 10/2010 | Uhlig | ............... | G06Q 10/06 |
| | | | | 715/752 |
| 2011/0288692 A1* | 11/2011 | Scott | ............... | H04L 63/20 |
| | | | | 700/297 |
| 2012/0023041 A1 | 1/2012 | Kariv et al. | | |
| 2015/0100166 A1* | 4/2015 | Baynes | ............... | H04L 12/2825 |
| | | | | 700/278 |
| 2015/0135263 A1* | 5/2015 | Singla | ............... | H04L 63/20 |
| | | | | 726/1 |
| 2015/0193325 A1* | 7/2015 | Harsan-Farr | ............... | G06F 11/3409 |
| | | | | 702/186 |
| 2016/0088008 A1* | 3/2016 | Perez Ramos | ............... | H04L 63/1425 |
| | | | | 726/23 |
| 2016/0110812 A1* | 4/2016 | Mun | ............... | G06Q 40/06 |
| | | | | 705/36 R |
| 2017/0053298 A1* | 2/2017 | Sun | ............... | G06Q 30/0203 |
| 2017/0054605 A1* | 2/2017 | Duncan | ............... | H04L 41/145 |
| 2017/0214712 A1* | 7/2017 | Maxwell | ............... | G06F 21/46 |
| 2018/0288063 A1* | 10/2018 | Koottayi | ............... | G06F 15/76 |
| 2019/0087256 A1* | 3/2019 | Horrell | ............... | G01D 3/08 |
| 2019/0124523 A1* | 4/2019 | Harrang | ............... | H04W 24/02 |
| 2020/0075172 A1* | 3/2020 | Noh | ............... | G06N 7/005 |

OTHER PUBLICATIONS (Wayne W. LaMorte, Survival Analysis, http://sphweb.bumc.bu.edu/otlt/MPH-Modules/BS/R/R-Manual/R-Manual21.html, Aug. 3, 2016, hereinafter LaMorte).*

(Anupama Biswas, Impact Analysis of System and Network Attacks, https://digitalcommons.usu.edu/cgi/viewcontent.cgi?article=1194&context=etd, Dec. 2008, hereinafter Biswas).*

JMP, "JMP Version 10, Modeling and Multivariat Methods", 2012, SAS Institute, p. 1-702. (Year: 2012).*

J.Z. Sikorska, M. Hodkiewicz, L. Ma, "Prognostic modelling options for remaining useful life estimation by industry", Mechanical Systems and Signal Processing, vol. 25, Issue 5, 2011, pp. 1803-1836, ISSN 0888-3270. (Year: 2011).*

Harald Sanftmann, "3D Visualization of Multivariate Data", Universitat Stuttgart, 2012, p. 1-157. (Year: 2012).*

Roberta Silva Yakabi, "Reliability Analysis and Visualization of product's lifetime behavior", Universidade Federal de Santa Catarina, 2015, p. 1-60. (Year: 2015).*

"What is Predictive Analytics?—Predictive Analytics Today," dated May 5, 2017, pp. 1-9, Predictive Analytics Today.

"What is Predictive Modeling," dated May 5, 2017, pp. 1-7, Predictive Analytics Today.

Examination Report No. 1, issued in Australia Patent Application No. 2017251824, dated Mar. 29, 2018, pp. 1-4, Australian Government, IP Australia, Canberra, Australia.

Australian Examination Report No. 2, issued in AU Application No. 2017251824, dated Feb. 15, 2019, pp. 1-7, Australian Patent Office (IP Australia), Phillip, Australia.

Kathy Ball et al., "Weathering the Storm: Using Predictive Analytics to Minimize Utility Outage," Proceedings of the SAS Global Forum 2013 Conference, Paper 232, dated Apr. 28, 2013, pp. 1-10, published by SAS Global Forum, Cary, NC.

Australian Examination Report No. 1, issued in AU Application No. 2019201687, dated Apr. 6, 2020, pp. 1-4, Australian Government, IP Australia, Canberra, Australia.

* cited by examiner

| | Date_Time ⬍ | Dates ⬍ | Time ⬍ | Weeknumbers ⬍ | weekends ⬍ | Holidays ⬍ | ExitWeekend ⬍ | WorkingDays ⬍ | EarlyMorning ⬍ | Morning ⬍ | La |
|---|---|---|---|---|---|---|---|---|---|---|---|
| 1 | 2015-02-04T00:00:00Z | 2015-02-04 | 0:00:00 | Wednesday | No | No | No | Yes | No | No | No |
| 2 | 2015-02-05T00:00:00Z | 2015-02-05 | 0:00:00 | Thursday | No | No | No | Yes | No | No | No |
| 3 | 2015-02-06T00:00:00Z | 2015-02-06 | 0:00:00 | Friday | No | No | No | Yes | No | No | No |
| 4 | 2015-02-07T00:00:00Z | 2015-02-07 | 0:00:00 | Saturday | Yes | No | No | No | No | No | No |
| 5 | 2015-02-08T00:00:00Z | 2015-02-08 | 0:00:00 | Sunday | Yes | No | No | No | No | No | No |
| 6 | 2015-02-09T00:00:00Z | 2015-02-09 | 0:00:00 | Monday | No | No | No | Yes | No | No | No |
| 7 | 2015-02-10T00:00:00Z | 2015-02-10 | 0:00:00 | Tuesday | No | No | No | Yes | No | No | No |
| 8 | 2015-02-11T00:00:00Z | 2015-02-11 | 0:00:00 | Wednesday | No | No | No | Yes | No | No | No |
| 9 | 2015-02-12T00:00:00Z | 2015-02-12 | 0:00:00 | Thursday | No | No | No | Yes | No | No | No |
| | 2015-02- | 2015-02- | | | | | | | | | |

FIG. 14

NETWORK DEVICE VULNERABILITY PREDICTION

CROSS-REFERENCE TO RELATED APPLICATIONS

This application claims priority under 35 USC § 119 to India patent application 201641036862 filed Oct. 27, 2016.

BACKGROUND

1. Technical Field

This application relates to networks and, in particular, to prediction of network device vulnerability.

2. Related Art

A network device may stop responding for many reasons. Unresponsiveness of the device may be represented as a "Fault" or a failure in a Fault Management System. The potential chances of the device's failure may be referred to as a vulnerability of the device. The device's failure may be caused by any reason including, for example: a performance issue in the device, a recent configuration change or patch upgrade, a failure to be compliant with network standards, a security breach, the life of the device, a regular or an unplanned maintenance of the device, a potential weather interruption, a natural disaster, and/or human error.

SUMMARY

A system may be provided that includes a processor that is configured to: detect an outage of a network device; determining the outage of the network device is an actual outage based on an indication that a human confirmed the outage of the network device was an actual outage; predict a vulnerability of the network device based on a survival analysis; and cause the vulnerability of the network device to be displayed.

A system may be provided that includes an adapter, a prediction engine, and graphical user interface framework. The adapter may be configured to detect an outage of a network device and to determine the outage of the network device is an actual outage based on an indication that a human confirmed the outage of the network device was an actual outage. The prediction engine may be configured to predict a vulnerability of the network device based on a survival analysis. The graphical user interface framework may be configured to cause the vulnerability of the network device to be displayed.

A method may be provided in which an outage of a network device is detected; the outage of the network device is determined to be an actual outage based on an indication that a human confirmed the outage of the network device was an actual outage; a vulnerability of the network device is predicted based on a survival analysis; and the vulnerability of the network device is caused to be displayed.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

FIG. 14 illustrates an example of a graphical user interface generated by the GUI framework that facilitates a user reviewing performance data, asset data, failure data, and/or vulnerability data;

DETAILED DESCRIPTION

Figure 1:
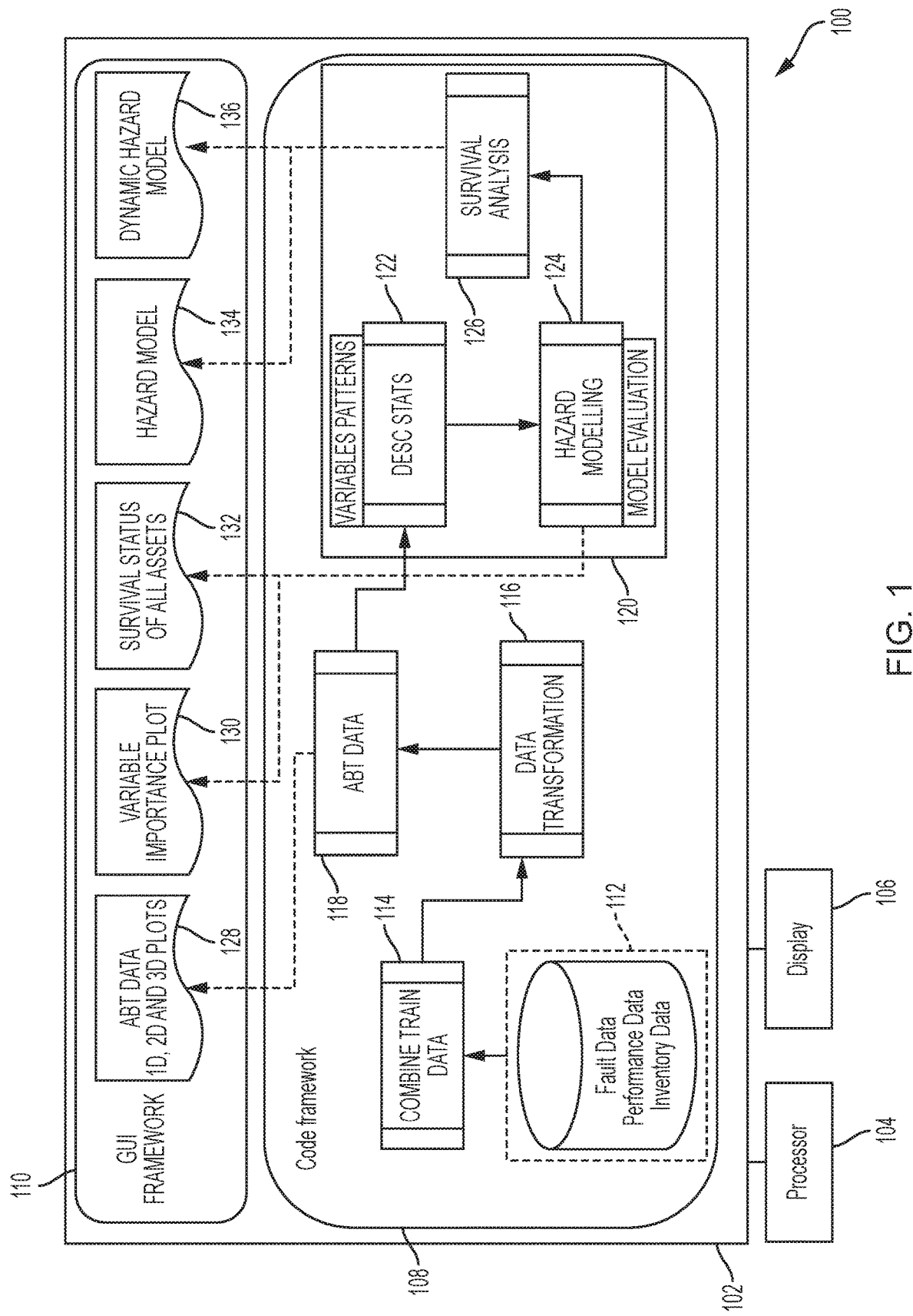
FIG. 1 illustrates an example of a network device vulnerability prediction system.

The vulnerability of network devices may be predicted which may affect telecom services rendered to customers of telecom providers. A prediction algorithm may be built by considering historical data from heterogeneous data sources. Frequent network outages may occur in telecom networks, which may lead to service degradation and decreased customer satisfaction of network health levels. The operating state of the network devices may be predicted, where the network devices, if failed, may impair the network health of a network of telecom service provider which provides network services to telecom customers. In some examples, predicting the operating state of the network devices may provide insight for a network operator to initiate appropriate preventive action before network service degradation occurs. Alternatively or in addition, predicting the operating state of the network devices may provide the insight needed to efficiently optimize network device resources based on the priority of network services rendered and segregation of customers utilizing these services.

By moving away from a "reactive" stance to a more "active" or "predictive" stance, a device vulnerability threat may be detected earlier. Also, earlier detection may increase the amount of time a service provider has to address a potential failure of the network device. In some examples, earlier detection may decrease down time for the impacted network services and affected customers, or otherwise mitigate the damage caused by the device becoming vulnerable.

The prediction algorithm used to predict the vulnerability is based on survival analysis. The survival analysis may examine and model the time it will take for outages to occur. Survival analysis focuses on the distribution of survival times of the network devices in a network. Survival modeling examines the relationship between survival of a network device and one or more predictors that are taken into consideration from the historical data obtained from the heterogeneous data sources.

In some examples, multiple aspects or predictors of device vulnerability may be focused on. Focusing on the multiple predictors may help communication providers to remain competitive. One such predicator is device average utilization, which when combined with device vulnerability impactors, may assist in core capacity planning processes which use passive measurements of core network utilization statistics. A predictor is a variable which is subsequently used during device vulnerability analysis. An impactor is a variable that affects one or more predictors. For example, percentage CPU utilization may be a predictor variable. Variables such as percentage memory utilization, network interface utilization, or any other variables that affect the predictor variable, which is percentage CPU utilization in this example, may be considered to be an impactor. In this example, if the percentage memory utilization were to increase beyond a threshold value, then the percentage CPU utilization may increase. The vulnerability impactors of the network devices may be inferred by the communication providers to optimize and/or to plan effectively for network or service upgrades in advance of failures. By upgrading in advance of failures, service providers may maintain a positive user experience and avoid breaches in service level agreements.

FIG. 1 illustrates an example of a network device vulnerability prediction system 100. The system 100 may include a memory 102, a processor 104 and a display device 106.

The memory 102 may include a code framework 108 and a graphical user interface (GUI) framework 110. The code framework 108 is executable by the processor 104 to process data from data sources 112 and predict the vulnerability of network devices (not shown) from the processed data. The GUI framework 110 is be executable by the processor 104 to generate one or more graphical user interfaces that may be displayed on the display device 106 or other display device. The graphical user interfaces may, for example, facilitate understanding variable patterns and/or visualize one or more models generated by the code framework 108. The code framework 108 may be written in R and/or other software language(s). The GUI framework 110 may be written in R Shiny and/or other software language(s).

The data sources 112 may include any source of relevant data. The data sources 112 may include, for example, a configuration management system, an inventory management system, a fault management system, a performance management system, a service management system, a compliance management system, and/or an interactive voice response (IVR) system.

The configuration management system may be any system for managing changes in software in network devices. Examples of the configuration management system may include HP Network Automation and IBM Tivoli Network Configuration Manager. The inventory management system may include any system for tracking inventory of devices and/or services in a network. Examples of the inventory management system may include Granite, Oracle UIM, and Amdocs Cramer. The fault management system may include any system that detects, isolates, and/or corrects malfunctions in a network. Alternatively or in addition, the fault management system may track issues reported and/or detected in the network. Examples of the fault management system may include IBM Tivoli Netcool/OMNIbus, HP Network Node Manager, BMC Remedy, Service Now, a network tickets management system, and/or an incident management system. The performance management system may include any system that monitors and measures relevant performance attributes (or performance indicators) of network devices and/or other resources. Examples of the performance management system may include Info vista and Tivoli Network Performance Manager. The service management system may include any system that connects network components with goals and/or service level agreements. Examples of the service management system may include HP Business Service Management and Tivoli Business Service Management. The compliance management system may include any system that automates compliance with policies, which in some examples, include policies regarding configuration changes in the network devices. An example of the compliance management system includes HP Network Automation. The IVR system may be any system with which a person may interact through the use of voice and/or DTMF tones input via a keypad. Examples of the IVR system may include Cisco Unified IP IVR, Hiper PBX, and/or a call center system.

Generally speaking, during operation of the system 100, the system 100 may probabilistically determine if a device is vulnerable or probabilistically determine a future path or action to be performed because of a network device being vulnerable in a communication service provider network. More specifically, during operation of the network device vulnerability prediction system 100, raw data may be processed, predicted values such as the vulnerability of the network devices (a prediction of, for example, the number of days before each respective network device is going to be vulnerable) and factor(s) leading to the vulnerability may be obtained. The predicted values and/or the factors leading to the predicted vulnerability may be displayed in an interactive dashboard along with intermediate charts that may be useful in making business decisions. An operator may then determine a future path or action based on the predicted values. For example, if memory utilization of a network device is predicted to be high, then a likely action that the operator may take is to check for processes that are utilizing more memory in the network device or check the network device for available storage space.

Operations may start by, for example, obtaining raw data from the data sources 112 and combining the raw data to form train data 114. Data transformation code 116 may transform the train data 114 to form analytical base table data 118.

A prediction engine 120 included in the code framework 108 may identify patterns 122 in variables from the analytical base table data 118. The prediction engine 120 may generate a hazard model 124 and perform a survival analysis 126.

The GUI framework 110 may display data 128 from the analytical base table data 118. Alternatively or in addition, the GUI framework 110 may display a variable importance plot 130 from the hazard model 124, a survival status 132 of network devices from the hazard model 124, a hazard model 134 from the survival analysis 126, and/or a dynamic hazard model 136 from the survival analysis 126.

Figure 2:
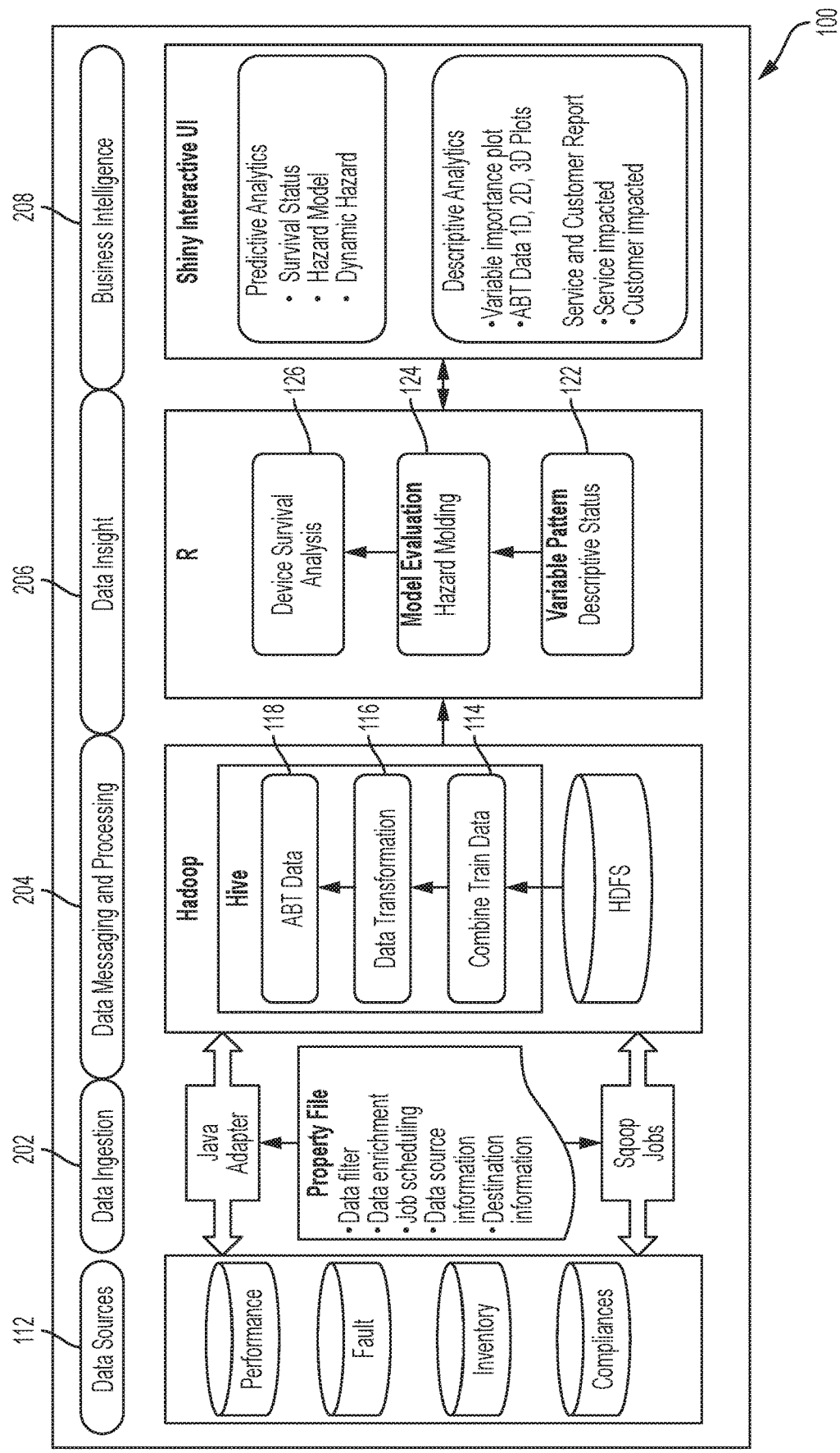
FIG. 2 is a flow diagram that illustrates the logic of an example implementation of the network device vulnerability prediction system.

FIG. 2 is a flow diagram that illustrates the logic of an example implementation of the network device vulnerability prediction system 100. The logic may include additional, fewer, or different operations than the example shown in FIG. 2.

A data lake is a method of storing data, in its natural or original format, within a system or repository, which facilitates the collocation of the data in various schemata and structural forms. The concept of the data lake is embodied in data ingestion 202 operation and data massaging and processing 204 operation.

The system 100 may ingest 202 data of any kind from the data sources 112. For example, the data may include network performance attributes, information about network and/or network device outages, compliance information, inventory data, and/or any other type of data. The data from the data sources 112 may be ingested 202 into the system 100 at various speeds and in various volumes.

During the ingestion 202 of the data, the system 100 may extract the data from the data sources 112 and load the data into a Hadoop file system or other repository system. For example, one or more Sqoop jobs may import the data into the Hadoop file system. Updates to the data may be handled by various data adapters which may continuously poll the data sources 112.

During the data massaging and processing 204 operation, the system 100 may transform the ingested data into the analytical base table data 118. In some examples, the system 100 may perform the transformation using a massive amount of data in a distributed computing environment using Hadoop and/or Hive. Alternatively or in addition, the system 100 may transform formats of the data, perform data enrichment, create metadata, and/or create analytics, such as determining counts, averages and ranges as the data is ingested. By ingesting 202 and massaging 204 the data, the system 100 implements a data lake.

Once the data is stored in the data lake and processed, the next step is deriving business value by gaining data insight 206. Gaining data insight 206 may help users to find data assets available in the data lake, automate registration, automate access to new data assets, and/or provide secure access to the data. Gaining data insight 206 may include identifying variable pattern(s) 122 through descriptive statistics, generating a hazard model 124, and/or performing device survival analysis 126.

Monitoring features may help to ensure that components of the system 100, from the storage technology to the analytics and reporting functions, is working properly. Monitoring features may provide tools to support intervention when necessary or desirable.

Any big data tool or framework, such as MapReduce, Hive, Pig, and Spark, may be used by the system 100 for parallel analytics capabilities, transforming words into counts, categories, or data set for analytical model creation, simple analytics, and/or creating metadata for various purposes. Hive supports most of the SQL access control model. In addition, both Apache Sentry and Apache Ranger may enable column level security over Hive where individual columns may be granted access. Sentry does this by using a construct similar to views. Apache Ranger uses a "go/no go" check on queries against a column ACL (access control list). Alternatively or in addition, record level access control may be provided by Hive query language to access records in HDFS (Hadoop file system). The system 100 may use Hadoop's database, HBase, for secure access because HBase supports access control at namespace, table and column family, and cell levels.

During a business intelligence 208 operation, the system 100 may perform descriptive analytics. For example, the system 100 may display analytical base table data 118, the variable importance plot 130 from the hazard model 124, or any other data related to descriptive analytics. Alternatively or in addition, the system 100 may perform predictive analytics. For example, the system may display the survival status 132 of network devices from the hazard model 124, the hazard model 134 from the survival analysis 126, and/or the dynamic hazard model 136 from the survival analysis 126. Alternatively or in addition, the system 100 may provide service and/or customer reports that identify services impacted and/or customers impacted by a future, predicted outage.

As a result, the business intelligence 208 operation may help in data discovery and data analysis in order to find and link related data concepts. In some examples, the GUI framework 110 may display various aspects of the vulnerability of each of a set of network devices in the next 30 days. The metadata may be used to identify critical, major and minor vulnerability of the devices with reports about the impact of the service due to the device vulnerability and impacted customers due to a failure of the vulnerable device(s).

Figure 3:
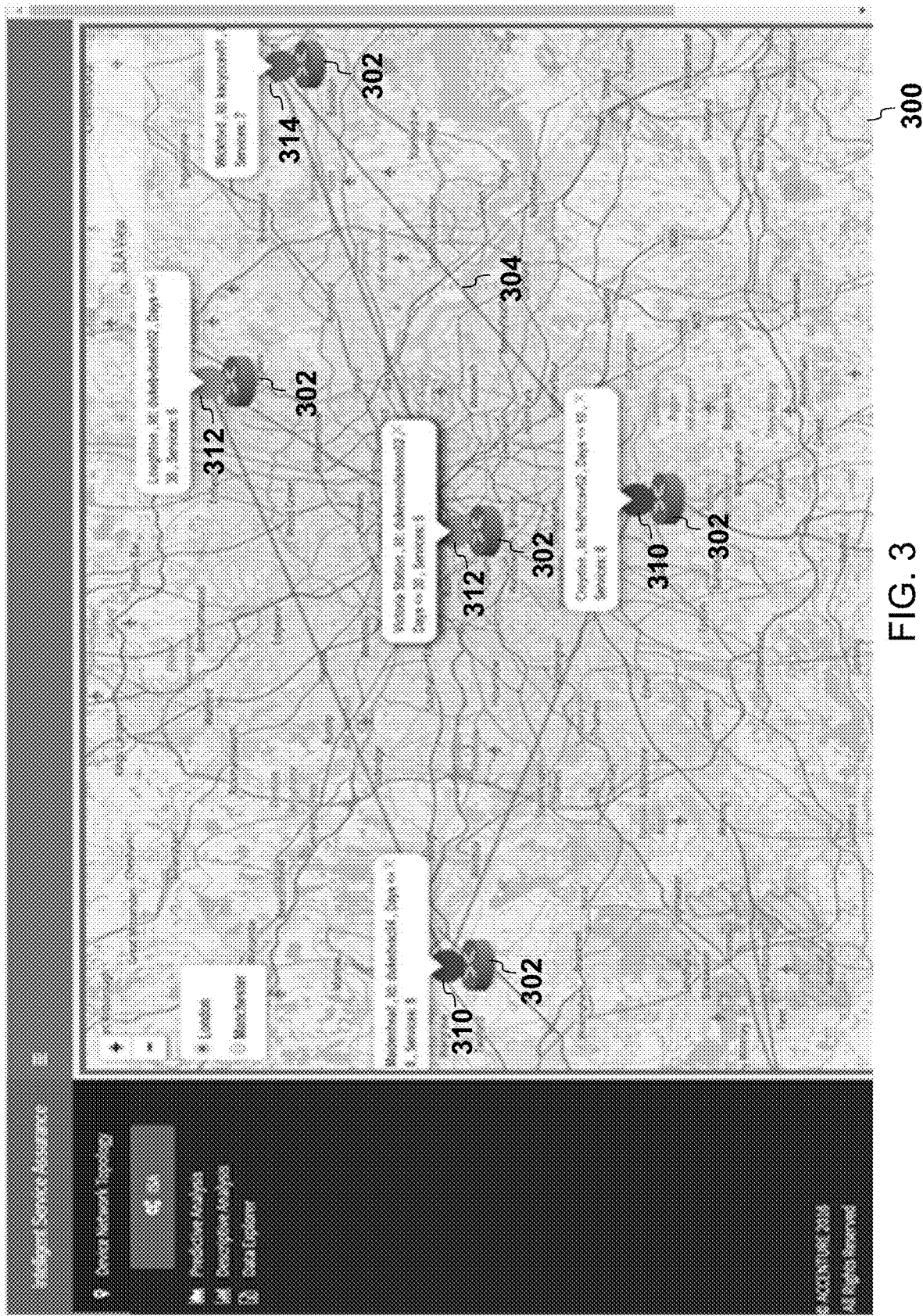
FIG. 3 illustrates an example of a graphical user interface generated by the GUI framework that shows a map and network devices positioned on the map.

FIG. 3 illustrates an example of a graphical user interface generated by the GUI framework 110 that shows a map 300 and network devices 302 positioned on the map 300 corresponding to the geographical locations of the network devices 302. The network devices 302 are part of a network 304. The GUI framework 110 may represent the respective predicted vulnerabilities of the network devices 302 by colors 310, 312, and 314. For example, a first color 310, such as red, may indicate that the respective network device(s) is vulnerable within a first time period, such as 10 days. A second color 312, such as amber, may indicate that the respective network device(s) is vulnerable within a second time period, such as 30 days. A third color 314 may indicate the respective network device(s) are not vulnerable within 30 days. In other examples, different colors, a different number of colors, and/or different time periods may be used.

The vulnerabilities may reflect the predicted vulnerabilities of the network devices 302 derived from the hazard model 124.

Figure 4:
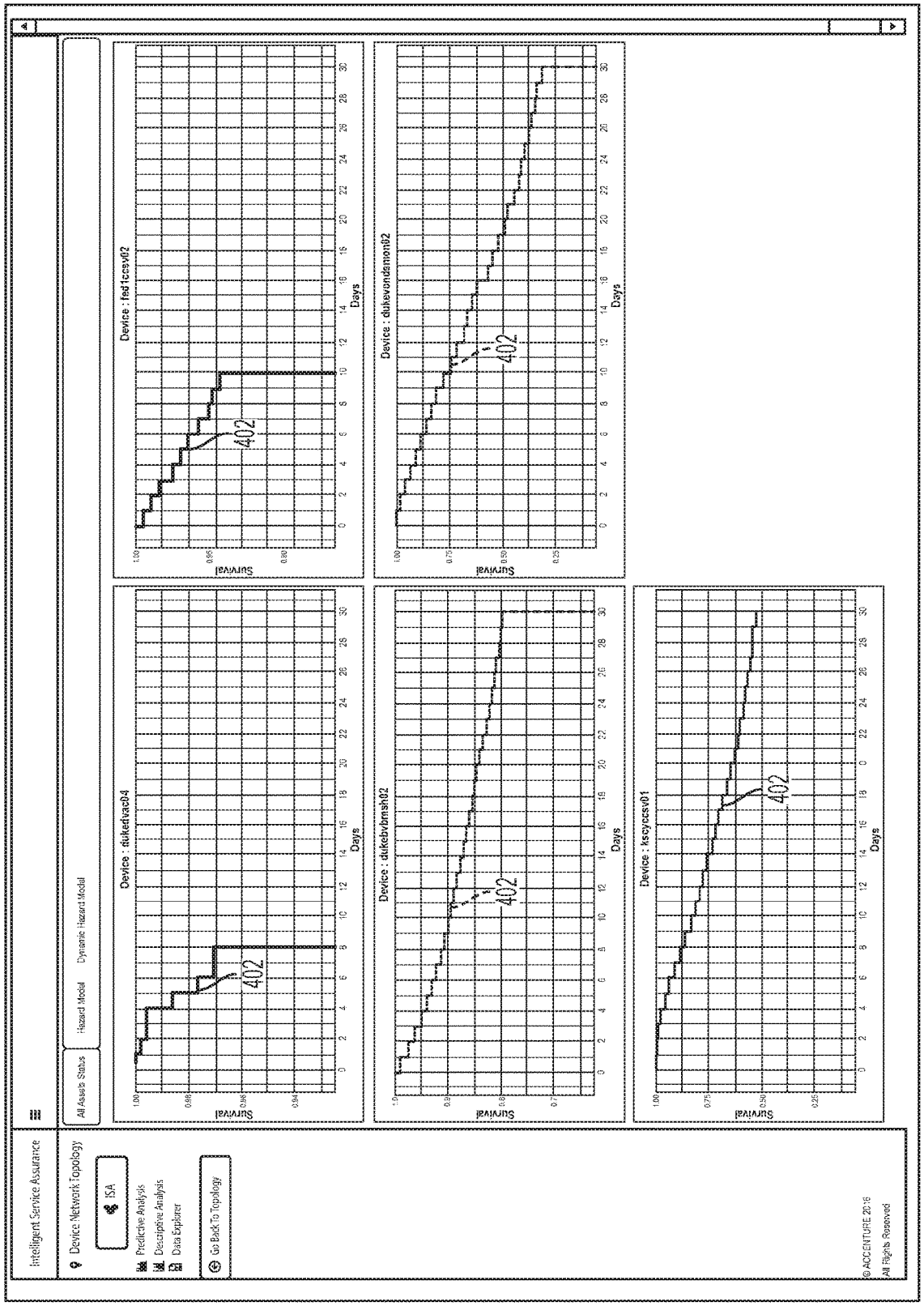
FIG. 4 illustrates an example of a graphical user interface generated by the GUI framework that shows a survival curve for each of the network devices.

FIG. 4 illustrates an example of a graphical user interface generated by the GUI framework 110 that shows a survival curve 402 for each of the network devices 302 on the network 304. The survival curve 402 shows the probability of survival over time for a network device.

The survival curve 402 may also show the probability of failure of the network device. This is because the inverse of the probability of survival is the probability of failure (probability of failure equals one minus the probability of survival). Accordingly, the survival curve 402 may be displayed either as a graph of the probability of failure or the probability of survival over time.

The colors of survival curves may represent the relative vulnerability of the devices. For example, the colors of the survival curves may be red, orange, and green, where red indicate the device is the most vulnerable, orange is less vulnerable, and green is the least vulnerable. In other examples, different colors, a different number of colors, and/or different visual indicators may be used to represent relative vulnerability.

Each of the survival curves in the example shown in FIG. 4 provides a visual indication of the number of days left before the respective network device becomes vulnerable to failure.

Figure 5:
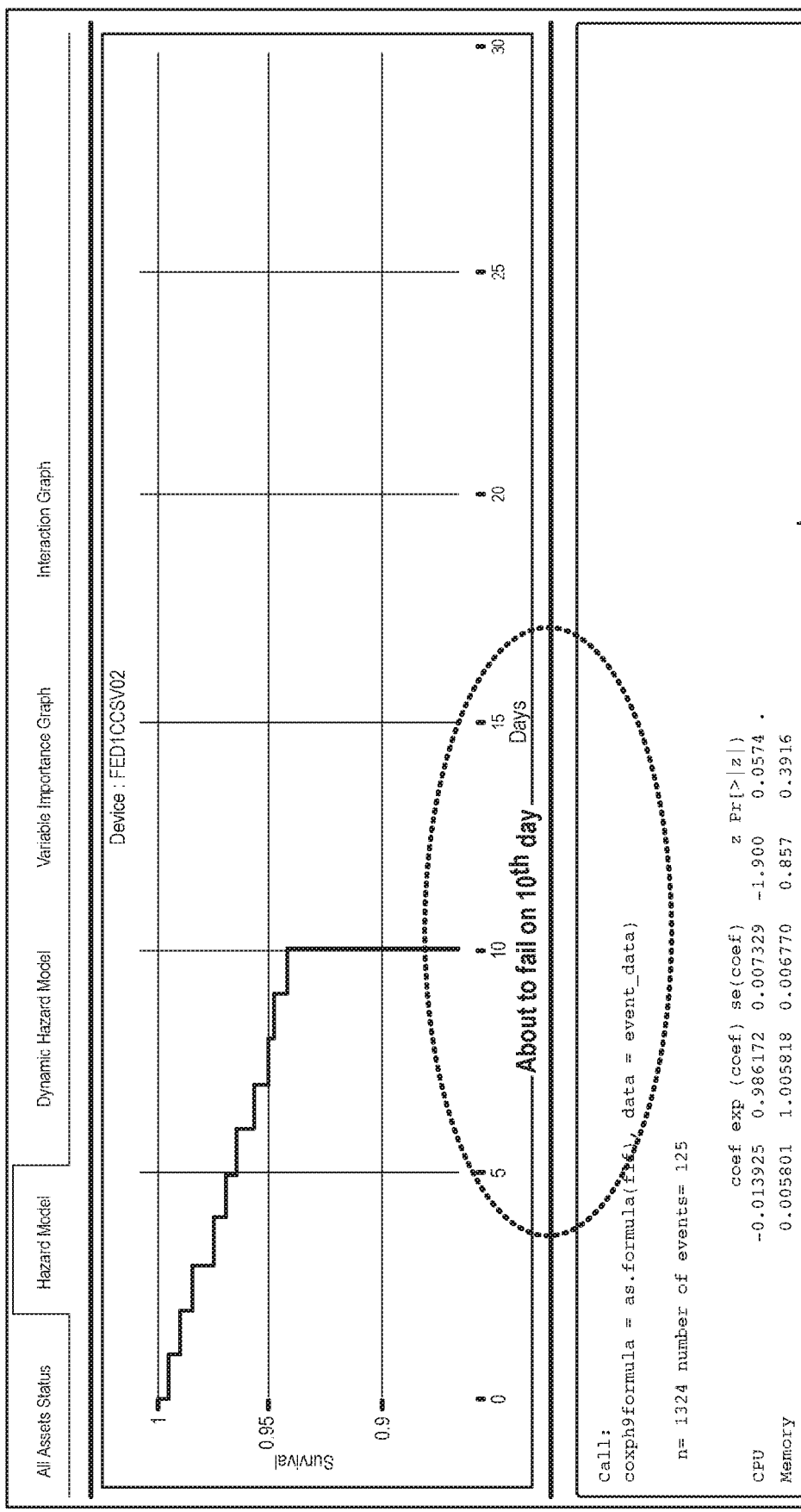
FIG. 5 illustrates an example of a graphical user interface generated by the GUI framework that shows the survival curve for a selected network device along with corresponding information on the hazard model.

FIG. 5 illustrates an example of a graphical user interface generated by the GUI framework 110 that shows the survival curve for a selected network device along with corresponding information 502 on the hazard model 124. The information 502 on the hazard model 124 may include the variables included in the hazard model 124 along with accuracy metrics.

Figure 6:
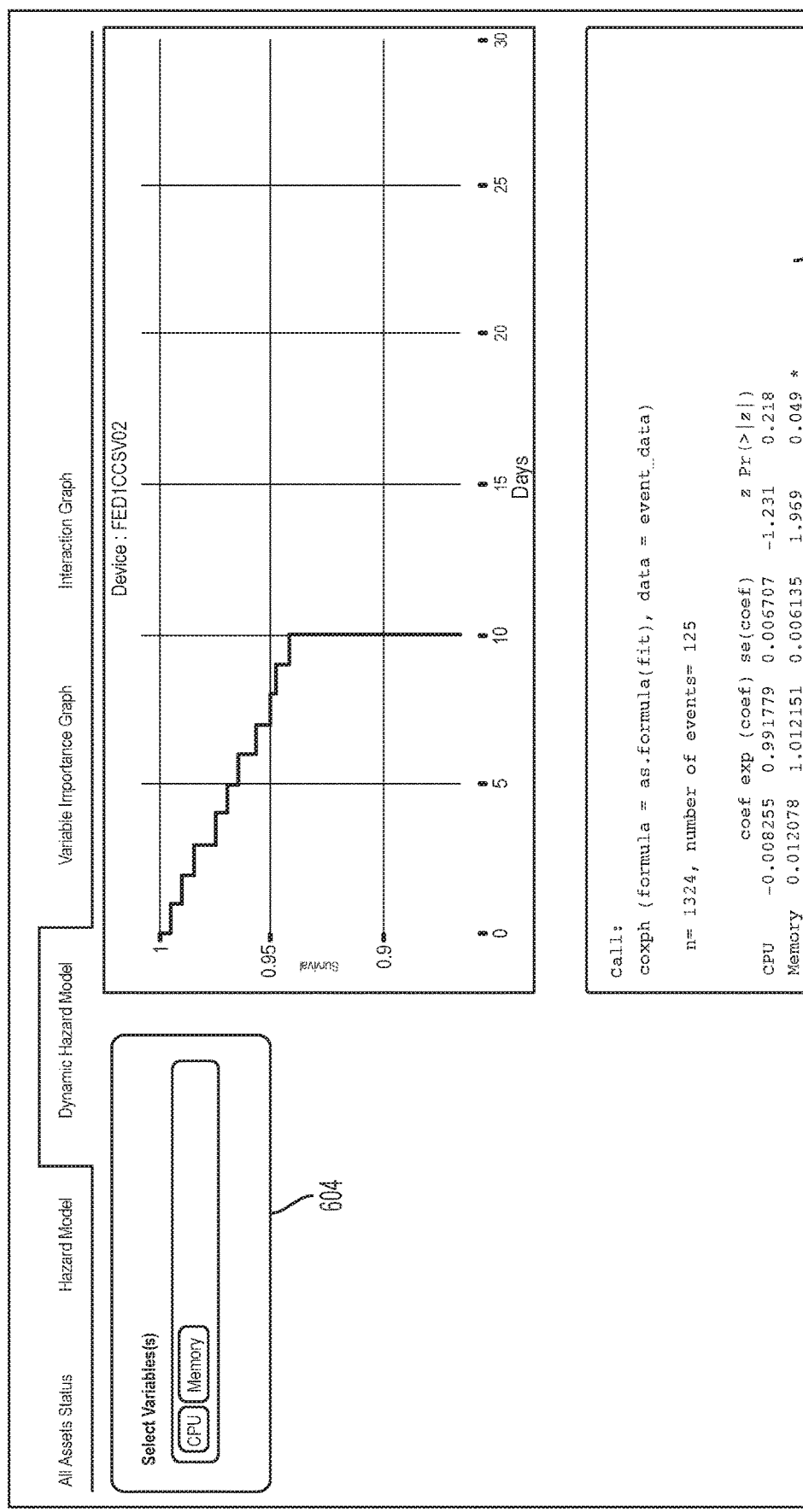
FIG. 6 illustrates an example of a graphical user interface generated by the GUI framework that shows the survival curve for a selected network device along with corresponding information on the hazard model.

FIG. 6 illustrates an example of a graphical user interface generated by the GUI framework 110 that shows the survival curve for a selected network device along with corresponding information 502 on the hazard model 124. The graphical user interface includes an option 604 to check the hazard model 124 by dynamically passing specified variables to the hazard model 124.

Figure 7:
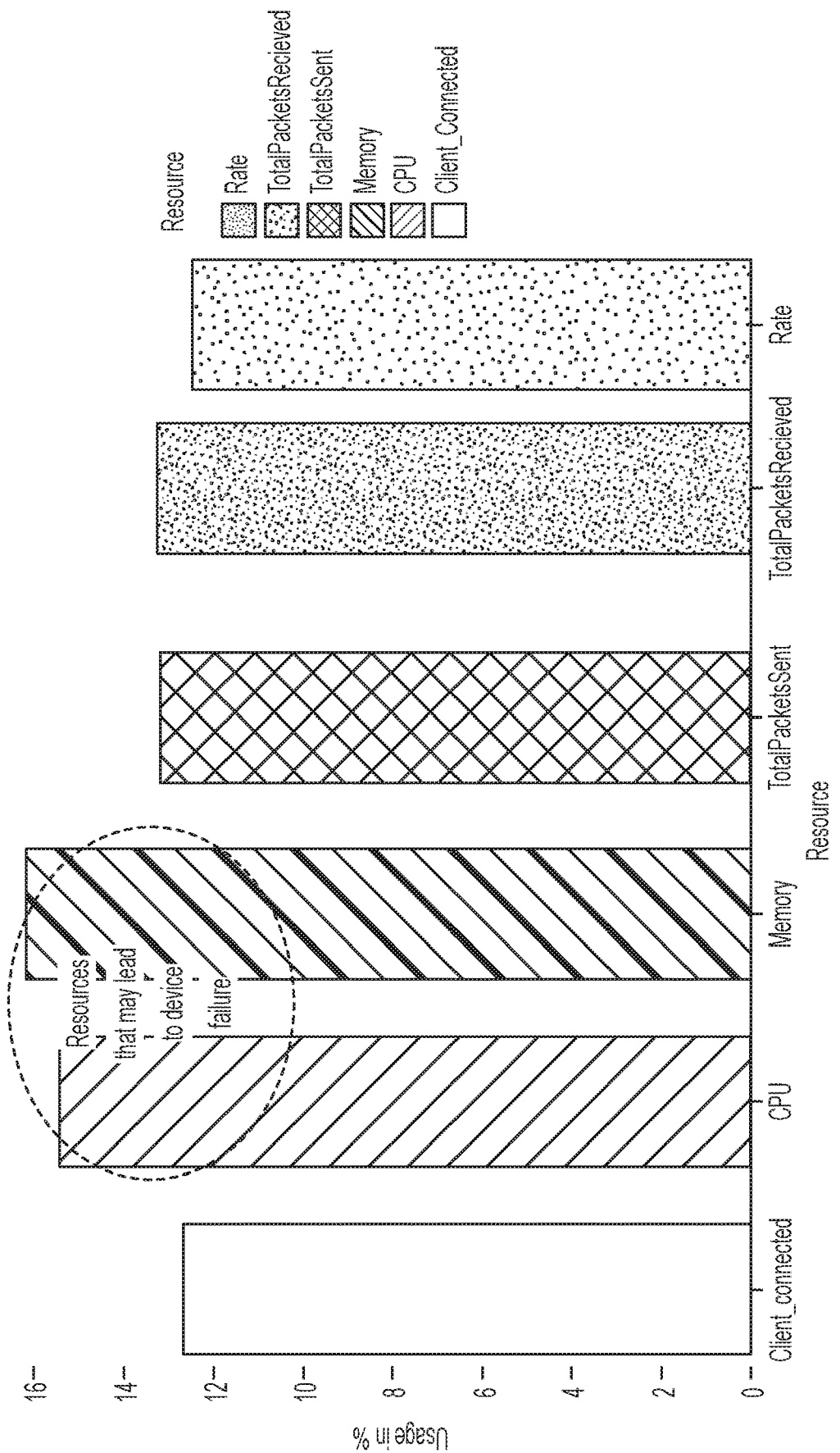
FIG. 7 illustrates an example of a graphical user interface generated by the GUI framework that shows a resource usage status of a selected network device.

Descriptive analytics may help a user to find underlying patterns in the variable parameters that have been simulated. Alternatively or in addition, descriptive analytics may help find underlying relationships between the variables. FIG. 7 provides an example of a graphical user interface for descriptive analytics.

FIG. 7 illustrates an example of a graphical user interface generated by the GUI framework 110 that shows a resource usage status of a selected network device. The user may select the device in the graphical user interface shown in FIG. 4, for example, and in response, the graphical user interface shown in FIG. 7 may be displayed.

The factors usage status may include the usage percentage for each resource (or attribute or factor) on the network device. An example of such a resource may be a CPU (central processing unit) and the usage percentage of the CPU may be the percent of the CPU that is being used. The graphical user interface shown in FIG. 7 may give the user an idea of steps that could be taken in order to keep the network device up and running.

Figure 8:
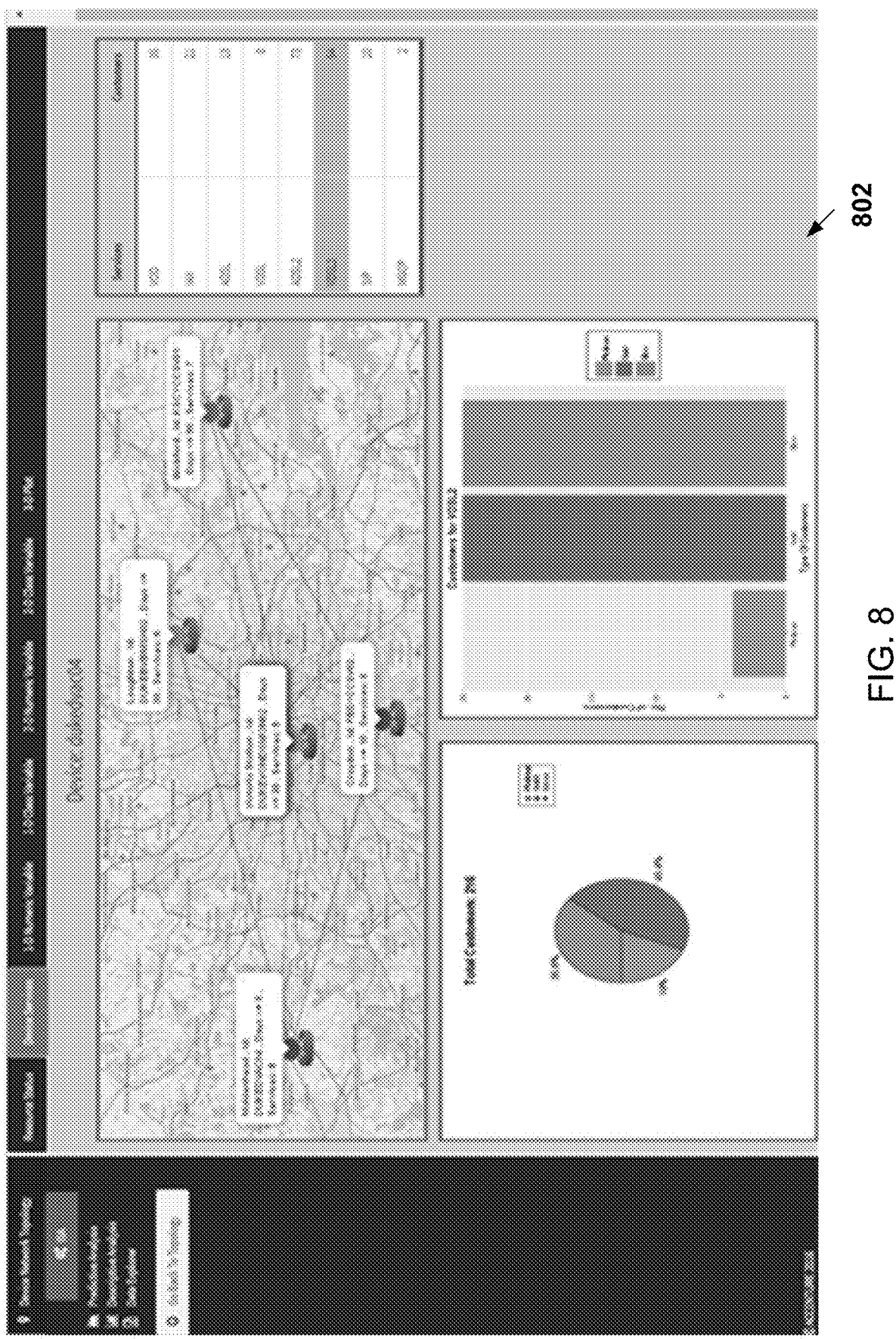
FIG. 8 illustrates an example of a graphical user interface generated by the GUI framework that shows a dashboard.

FIG. 8 illustrates an example of a graphical user interface generated by the GUI framework 110 that shows a dashboard 802. The dashboard shows information about customers and services that may be affected by a failure of a selected network device. In the example shown, the dashboard 802 lists the services running on the selected device, and the number of customers using each respective service. In addition, the dashboard 802 shows the total number of customer that would be affected if the network device were to fail. The dashboard 802 provides a breakdown of those affected customers by their service level, such as gold, silver and platinum service levels. The breakdown is shown in a pie chart and in a bar graph. In other examples, the dashboard 802 may include fewer, additional, and/or different information.

Figure 9:
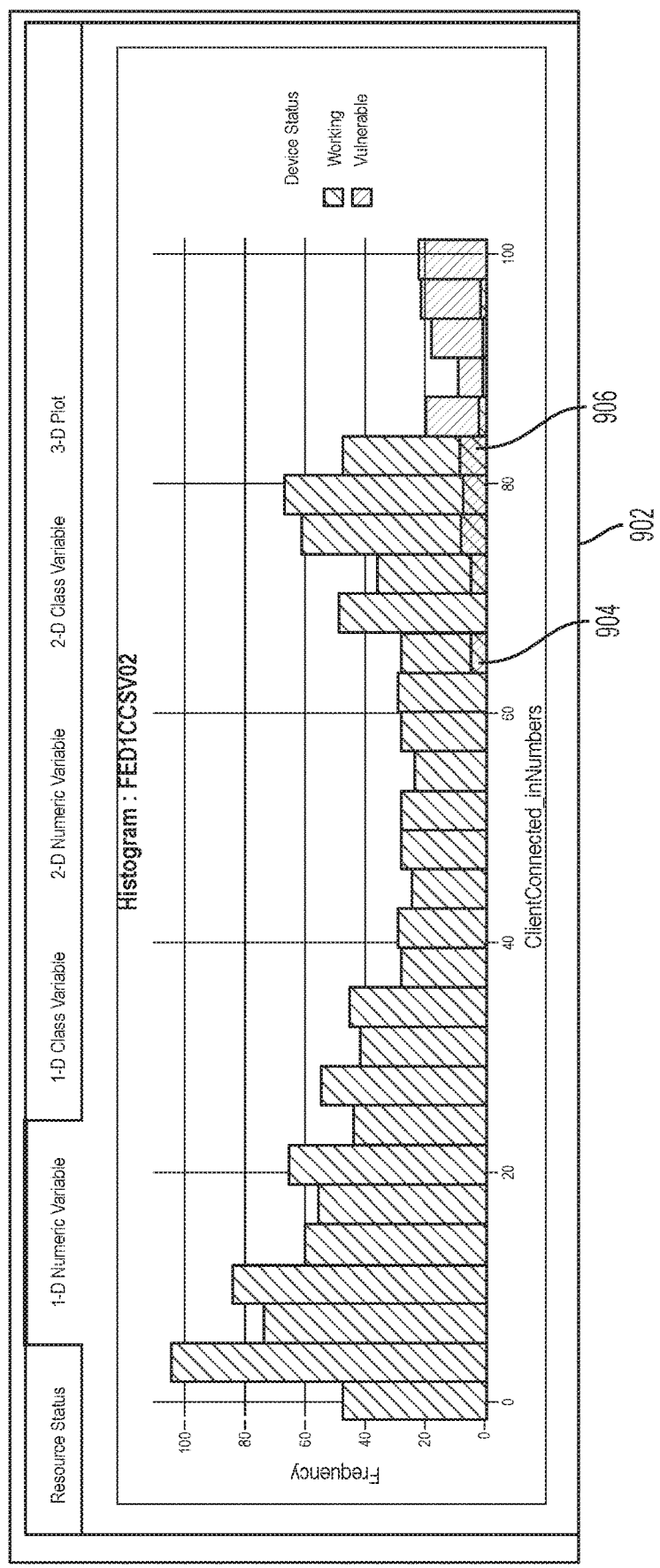
FIG. 9 illustrates an example of a graphical user interface generated by the GUI framework that shows one-dimensional numeric variable chart.

FIG. 9 illustrates an example of a graphical user interface generated by the GUI framework 110 that shows one dimensional numeric variable chart 902. The chart 902 shown in FIG. 9 is for the variable "ClientsConnected_inNumbers", which represents the number of clients connected to the selected network device.

One dimensional numeric variable charts, such as the chart 902 depicted in FIG. 9, may be constructed by the system 100 to view numerical (continuous) variables sliced across device status for which modeling activity is conducted. Examples of device status may include working and vulnerable.

The charts may be overlapping histograms. Overlapping histograms may help to identify possible relationships and/or interactions between a selected continuous variable, such as the variable "ClientsConnected_inNumbers" in FIG. 9, and the various device statuses. Each vertical bar in the histogram represents the number of records present within a particular range of the variable and also further split into various device statuses. In the example shown in FIG. 9, as the number of clients increases past a first threshold value 904, the number of vulnerable devices becomes non-zero. As the number of clients increases past a second threshold value 906, the number of working devices drops to zero.

Figure 10:
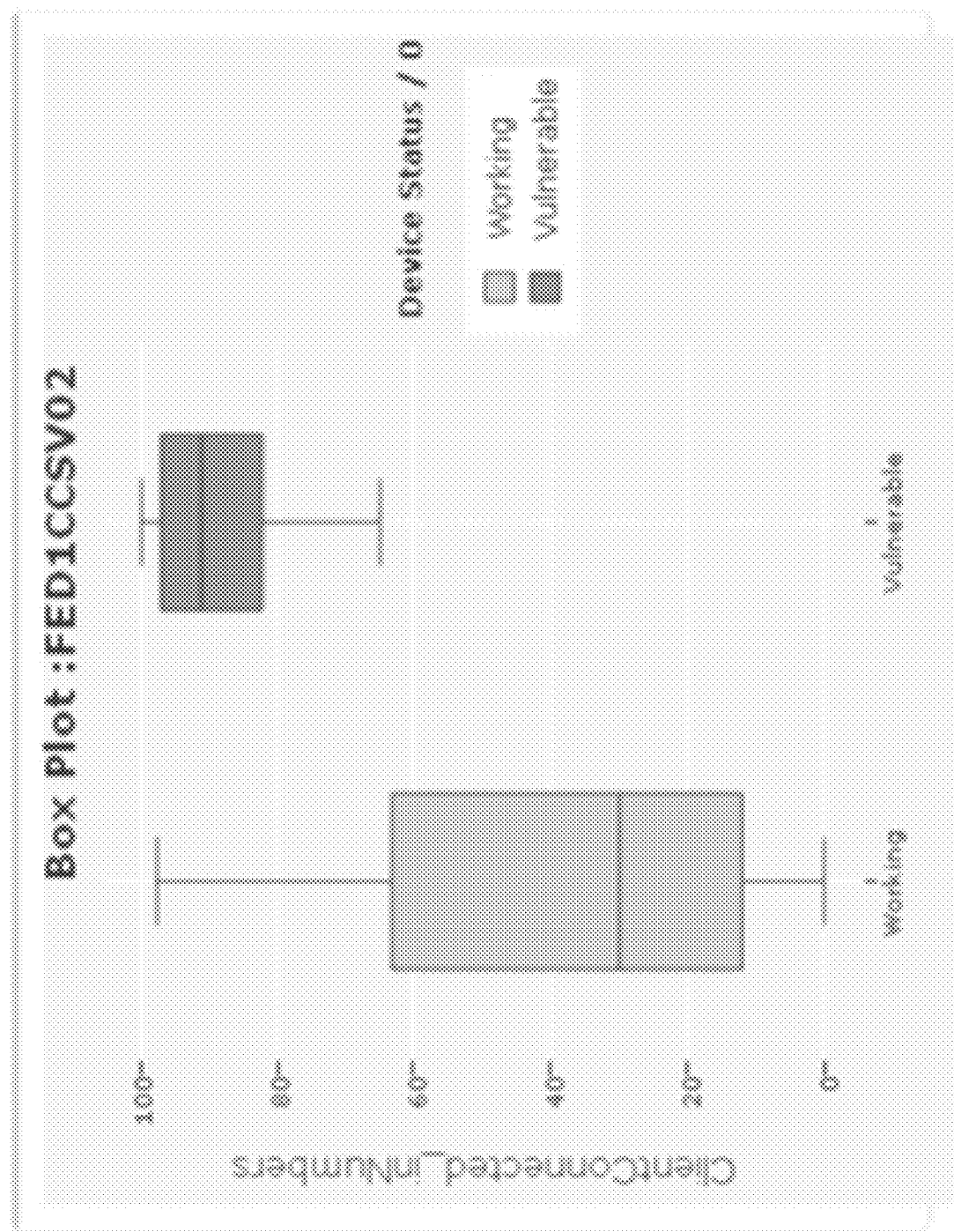
FIG. 10 illustrates an example of a graphical user interface generated by the GUI framework that shows a box plot.

FIG. 10 illustrates an example of a graphical user interface generated by the GUI framework 110 that shows a box plot. Box plots primarily illustrate a spread of the data values with respect to categories within the data. In FIG. 10, the categories are device statuses "Working" and "Vulnerable". Within each category, the spread of the "ClientsConnected_inNumbers" values are shown. A horizontal line inside each box is a median value. Each section of the boxplot (the minimum to Q1, Q1 to the median, the median to Q3, and Q3 to the maximum) contains 0.25 of the data no matter what. If one of the sections is longer than another, it indicates a wider range in the values of data in that section, which means the data is more spread out. A shorter section of the box plot indicates the data is more condensed, which means closer together.

Figure 11:
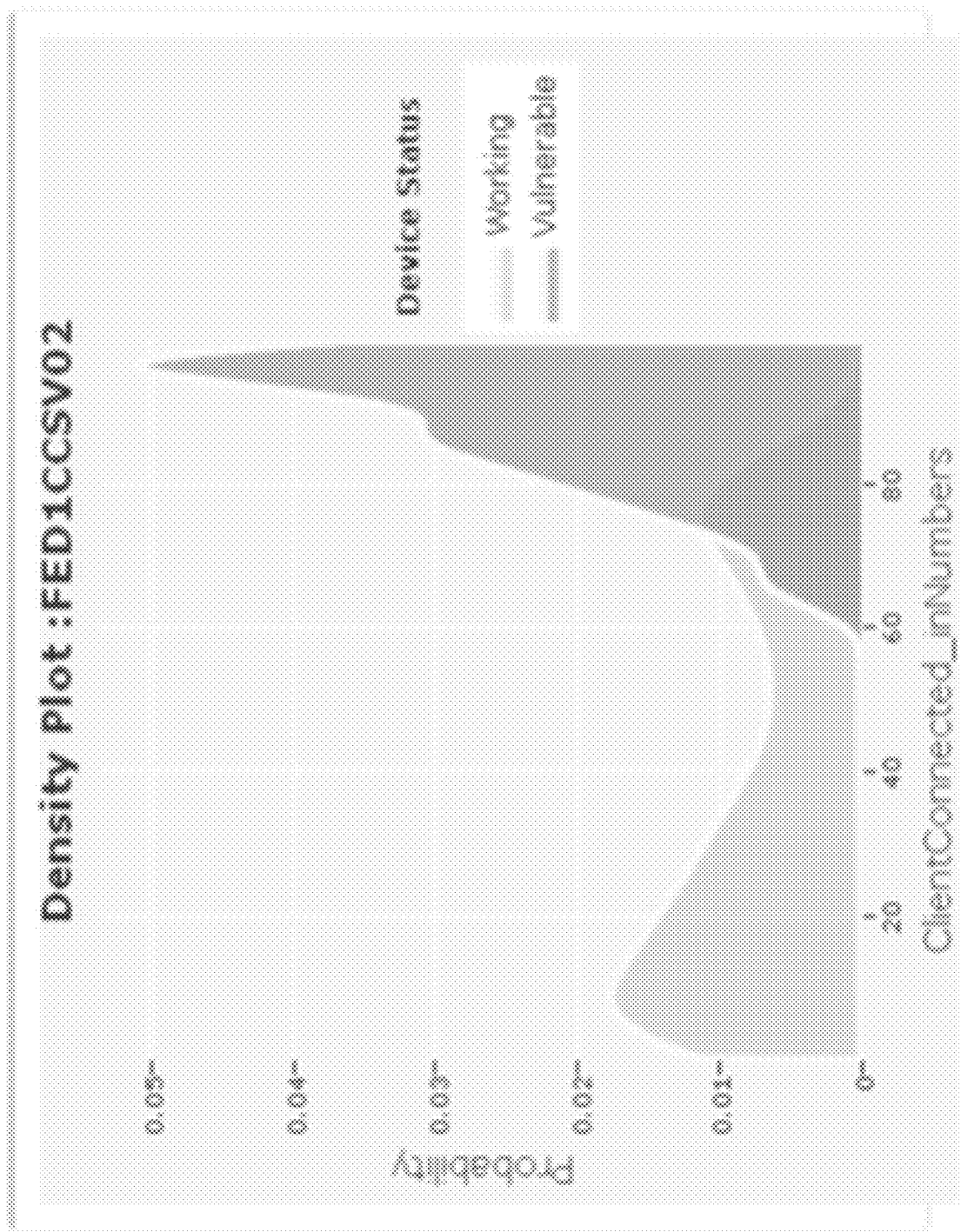
FIG. 11 illustrates an example of a graphical user interface generated by the GUI framework 110 that shows an overlapping density plot.

FIG. 11 illustrates an example of a graphical user interface generated by the GUI framework 110 that shows an overlapping density plot 1102. Overlapping density plots are probability plots, which are also known as estimation plots. Density plots may help understand the probability of a particular value occurring. In this example, the density plot 1102 indicates what the probability is that "ClientsConnected_inNumbers" will have a particular value for a selected network device in a predetermined time in the future, such as in one month.

In the overlapping density plot 1102 shown in FIG. 11, density plots are created for each status (for example, "Working" and "Vulnerable") of the selected network device and overlapped. Such a density plot may be helpful to analyze how the probability of the various statuses and/or the estimated values change.

Figure 12:
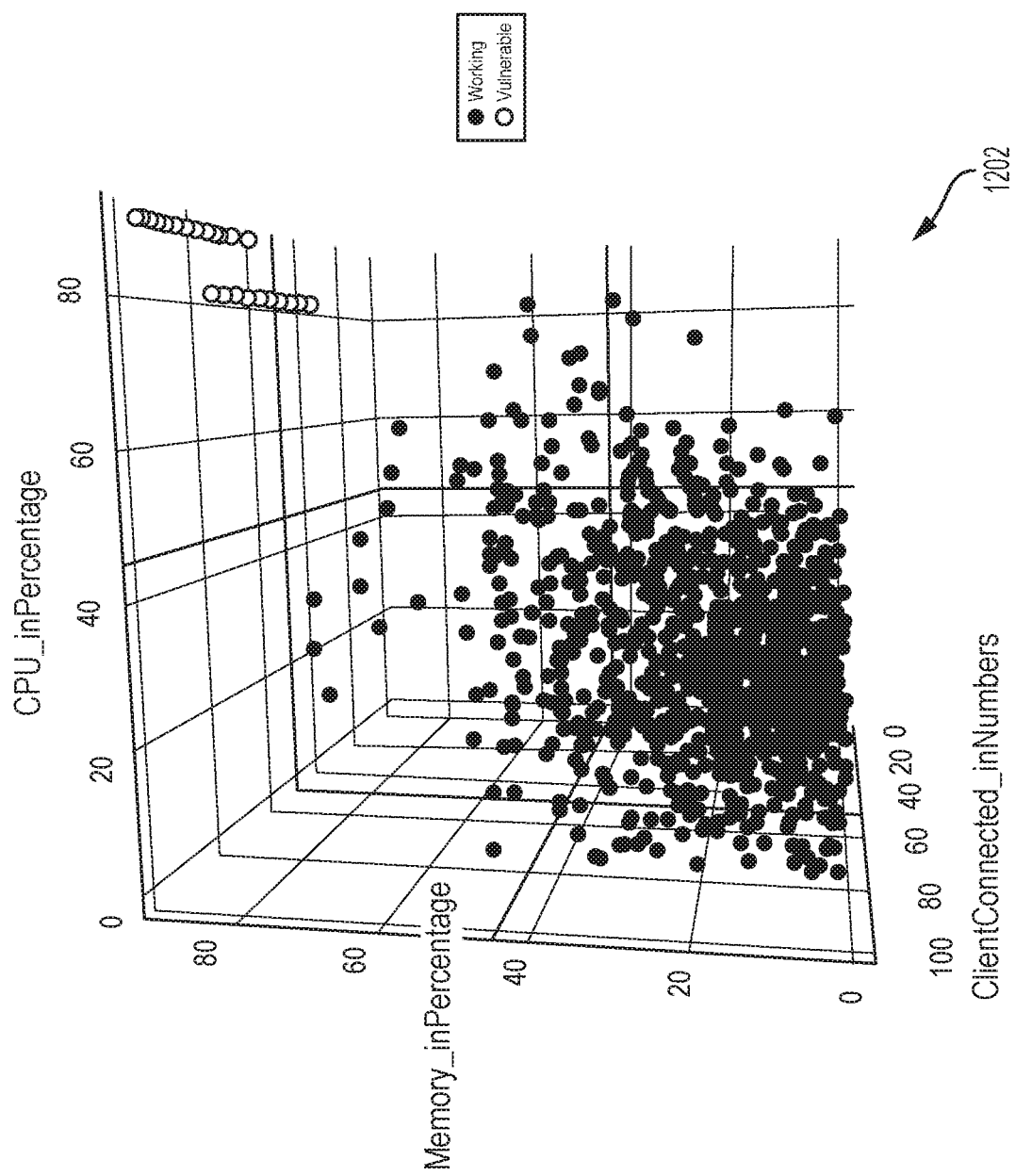
FIG. 12 illustrates an example of a graphical user interface generated by the GUI framework 110 that shows a three-dimensional scatter plot.

FIG. 12 illustrates an example of a graphical user interface generated by the GUI framework 110 that shows a three-dimensional scatter plot 1202.

The three-dimensional scatter plot 1202 shows distributions for three numeric (continuous) variables and one non-numeric (categorical) variable. The three-dimensional scatter plot 1202 is constructed to view the relationship between all the three numerical (continuous) variables against the selected non-numeric (categorical) variable in a predetermined time in the future, such as in one month.

Figure 13:
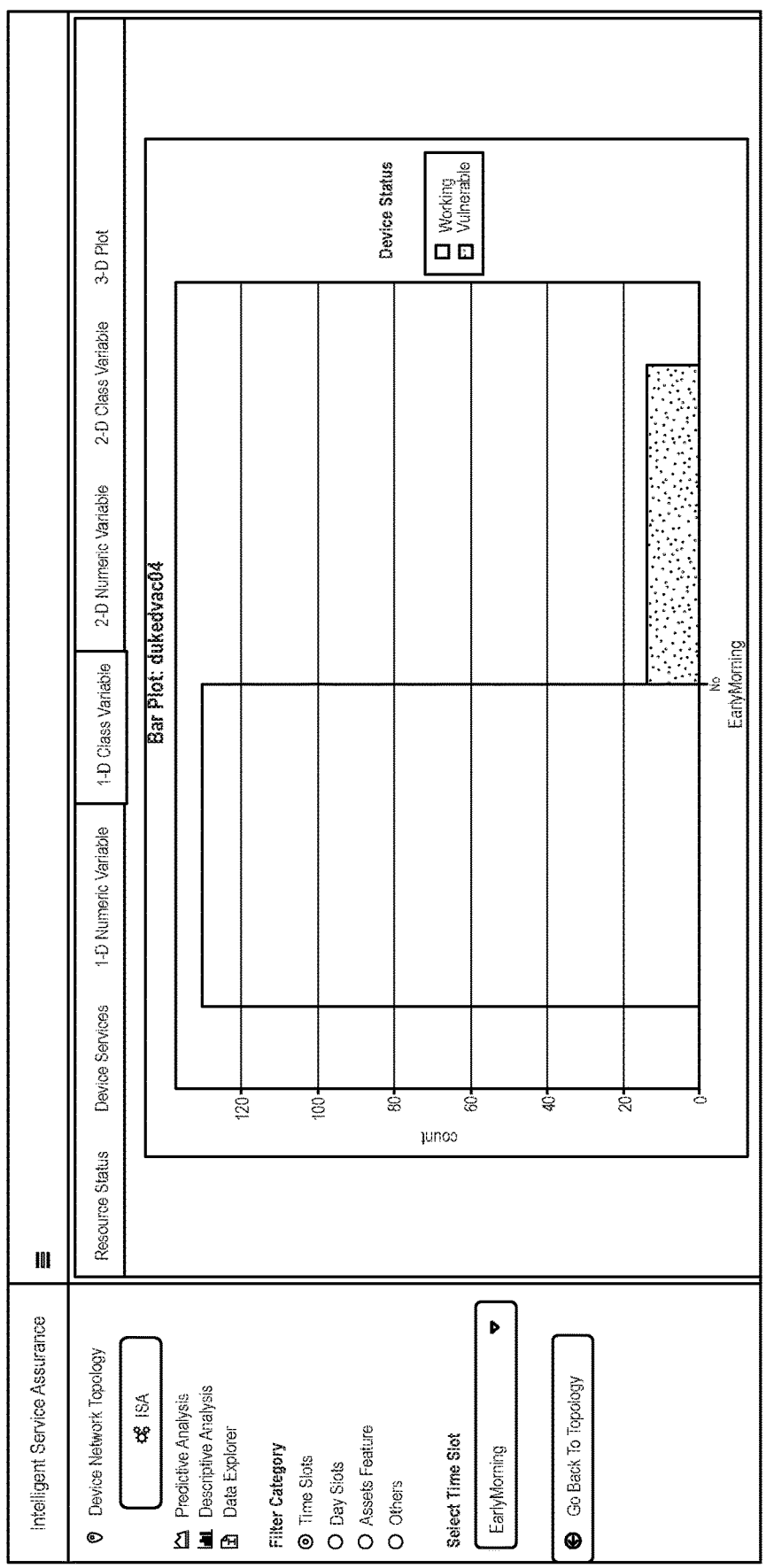
FIG. 13 illustrates an example of a graphical user interface generated by the GUI framework 110 that shows a box plot representation of samples of a particular factor.

FIG. 13 illustrates an example of a graphical user interface generated by the GUI framework 110 that shows a box plot representation of samples of a particular factor (variable) which are working (blue color) and vulnerable (reddish brown) during various interval periods of the day. In FIG. 13, an "EarlyMorning" interval is selected. In this context, the samples represent the data distribution. The distribution helps identify which sample has a higher frequency of occurrence for the identified variable.

FIG. 14 illustrates an example of a graphical user interface generated by the GUI framework 110 that facilitates a user reviewing performance data, asset data, failure data, and/or vulnerability data. Tabs or any other suitable GUI component may be used to select which type of data to view. In providing such a GUI, a user may view a data set or a sample set of the various factors that contribute to network vulnerability.

Figure 15:
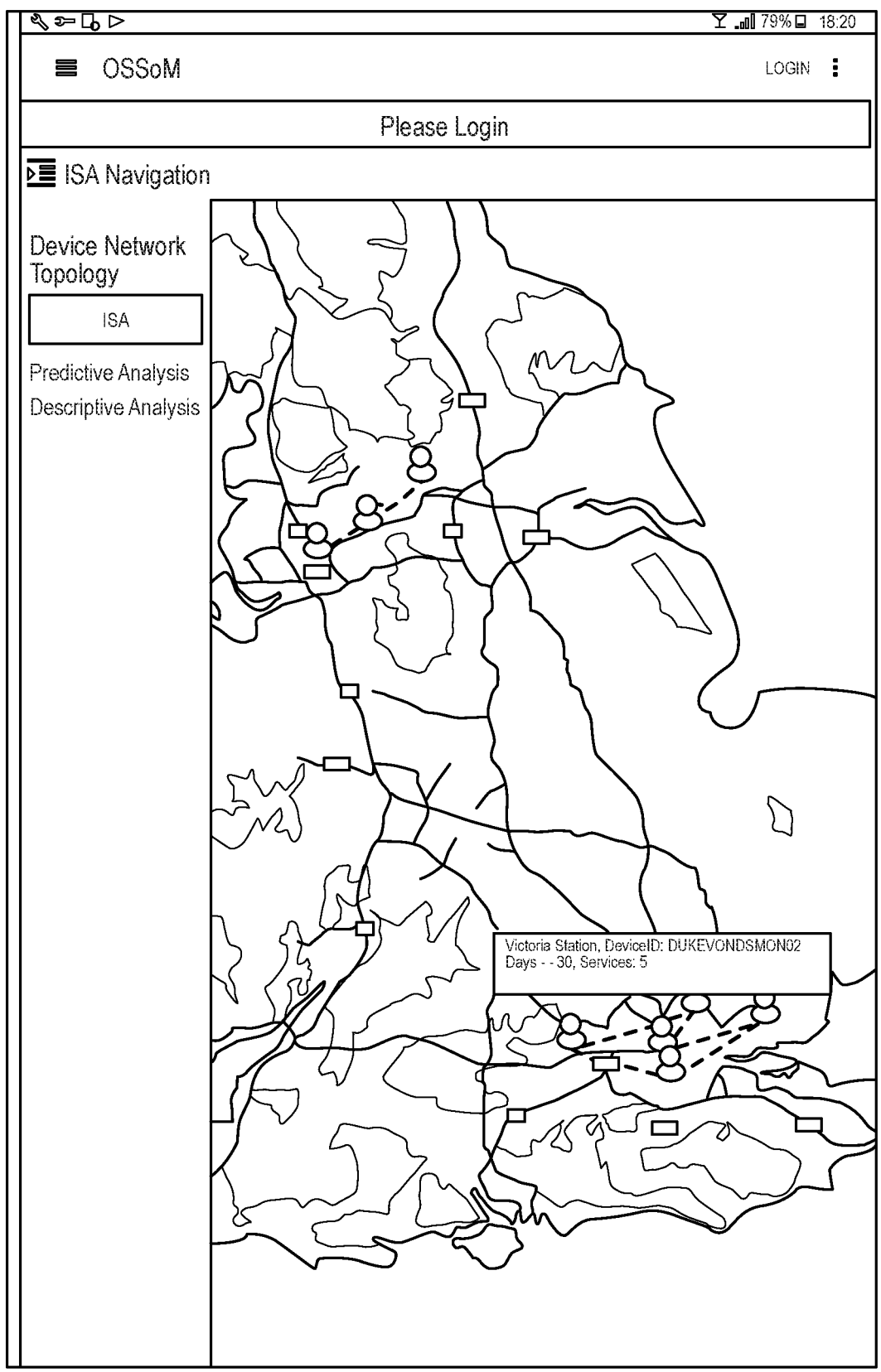
FIG. 15 illustrates an example of a graphical user interface generated by the GUI framework that shows a map and network devices positioned on the map corresponding to the geographical locations of the network devices.
Figure 16:
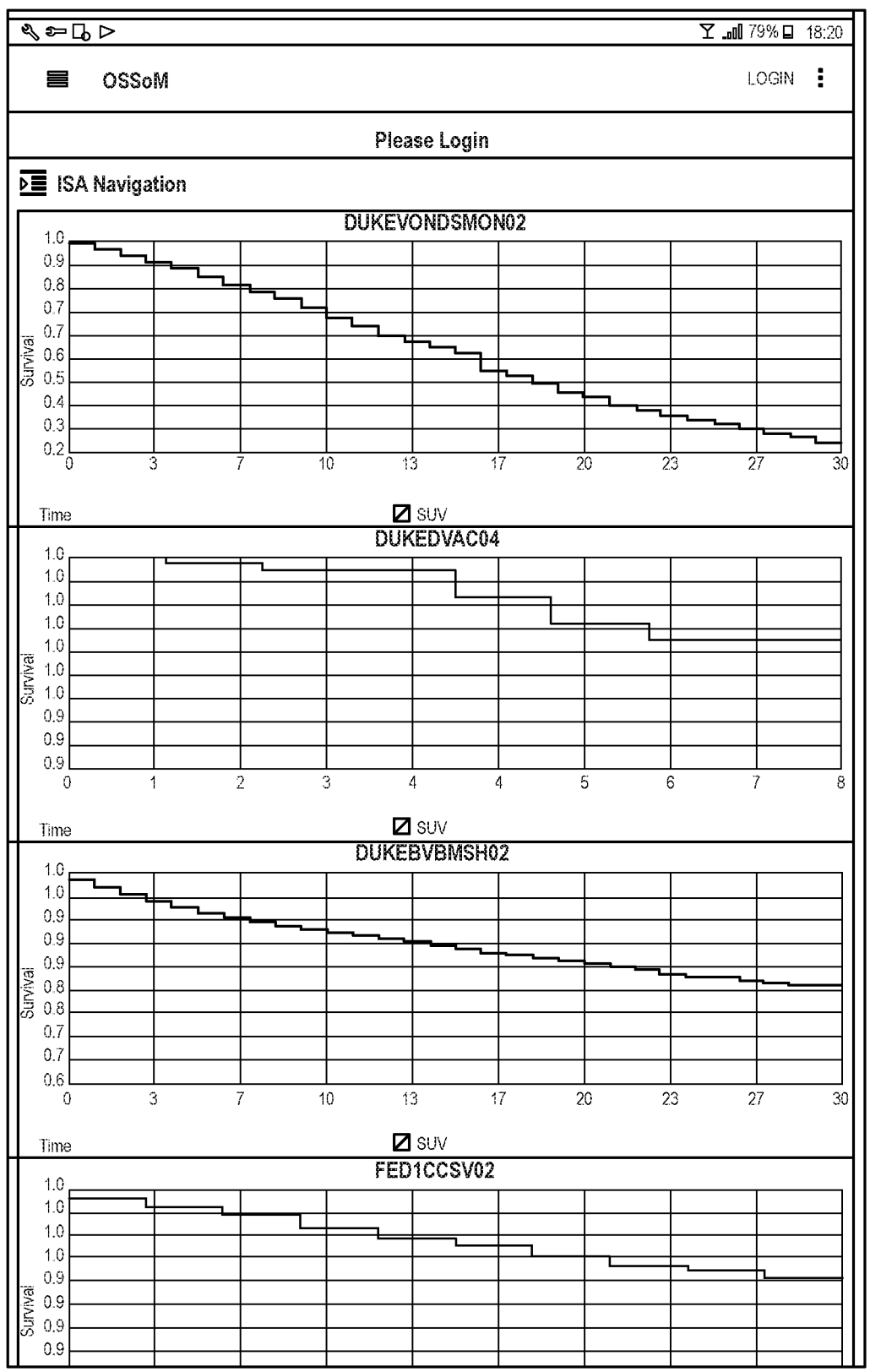
FIG. 16 illustrates an example of a graphical user interface generated by the GUI framework that shows survival curves for the network devices on the network.
Figure 17:
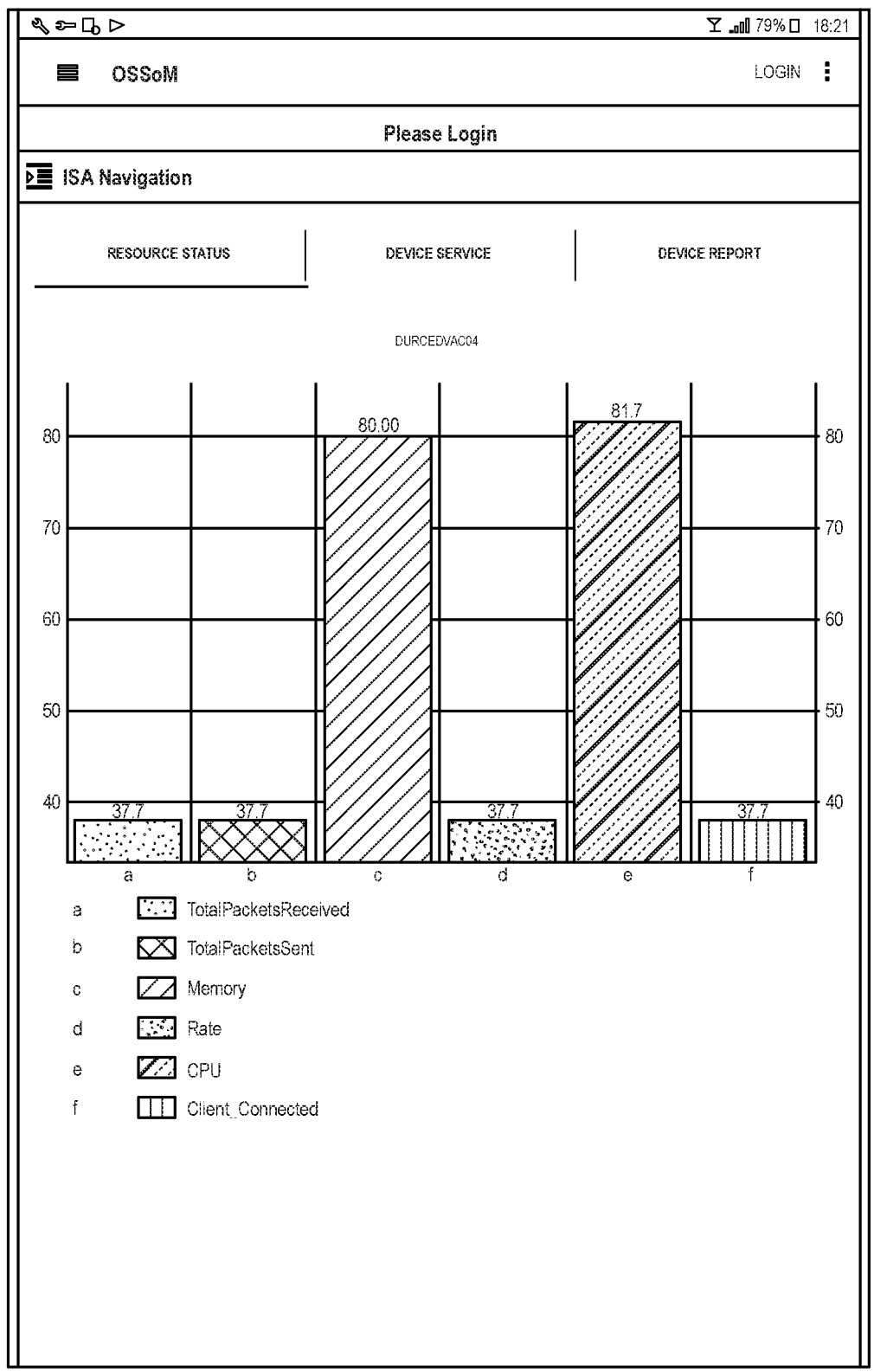
FIG. 17 illustrates an example of a graphical user interface generated by the GUI framework that shows a resource usage status of a selected network device.
Figure 18:
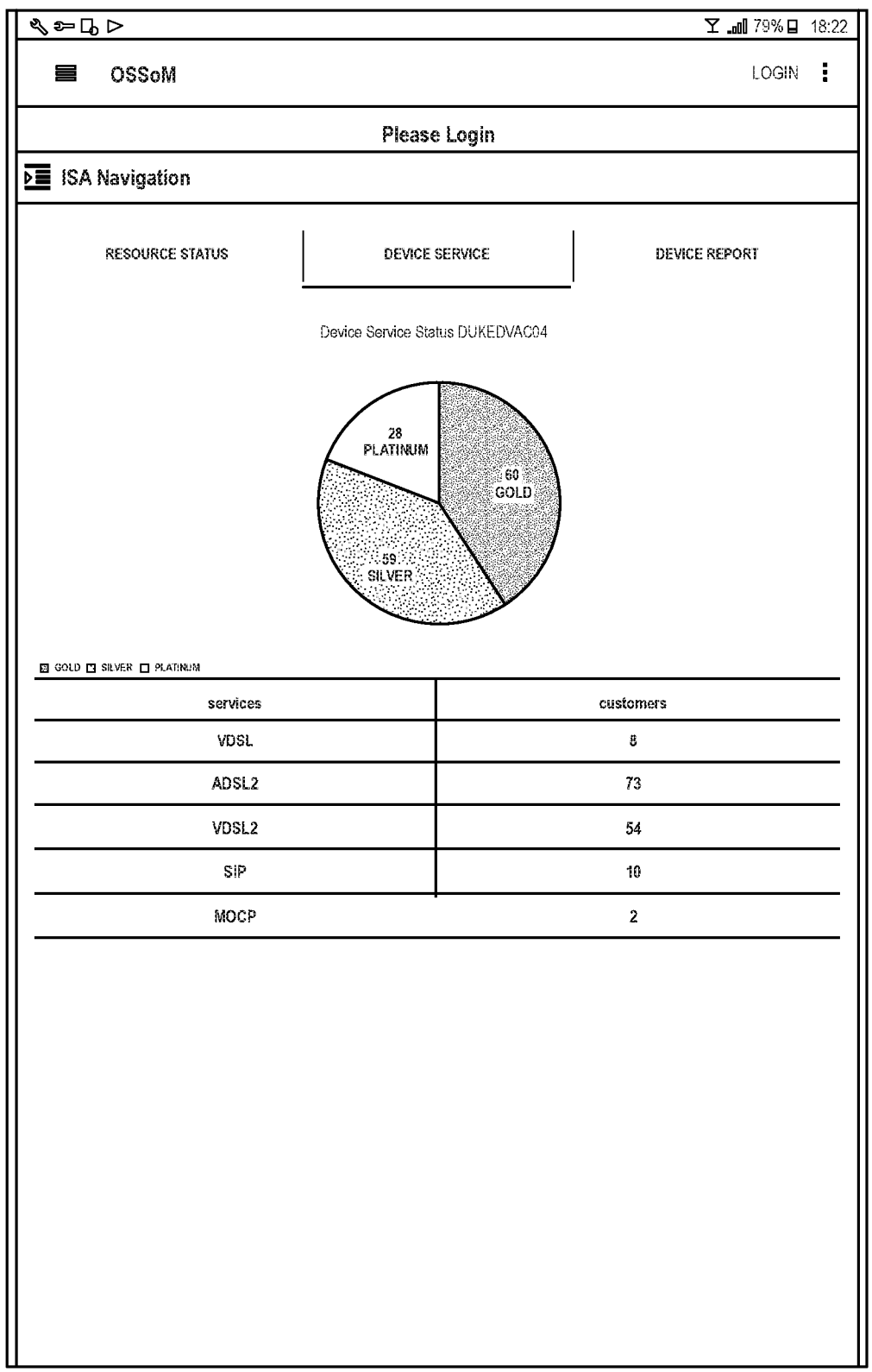
FIG. 18 illustrates an example of a graphical user interface generated by the GUI framework that shows information about customers and services that may be affected by a failure of a selected network device.
Figure 19:
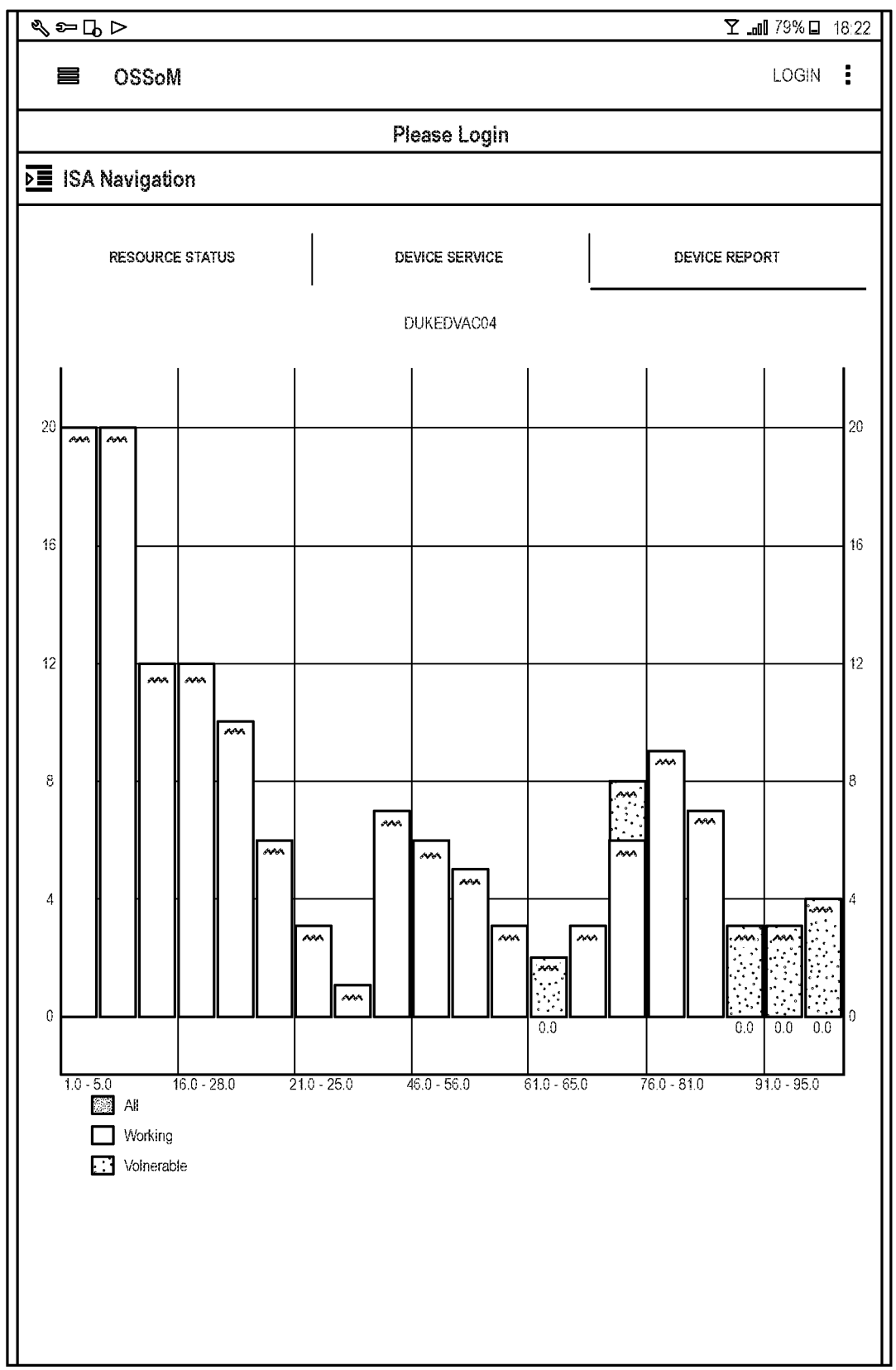
FIG. 19 illustrates an example of a graphical user interface generated by the GUI framework that shows a one-dimensional numeric variable chart.

FIGS. 15 to 19 illustrate examples of GUIs rendered on a mobile device, such as an Android operating system based mobile device. FIG. 15 illustrates an example of a graphical user interface generated by the GUI framework 110 that shows a map and network devices positioned on the map corresponding to the geographical locations of the network devices. FIG. 16 illustrates an example of a graphical user interface generated by the GUI framework 110 that shows survival curves for the network devices on the network. FIG. 17 illustrates an example of a graphical user interface generated by the GUI framework 110 that shows a resource usage status of a selected network device. FIG. 18 illustrates an example of a graphical user interface generated by the GUI framework 110 that shows information about customers and services that may be affected by a failure of a selected network device. FIG. 19 illustrates an example of a graphical user interface generated by the GUI framework 110 that shows a one dimensional numeric variable chart.

Figure 20:
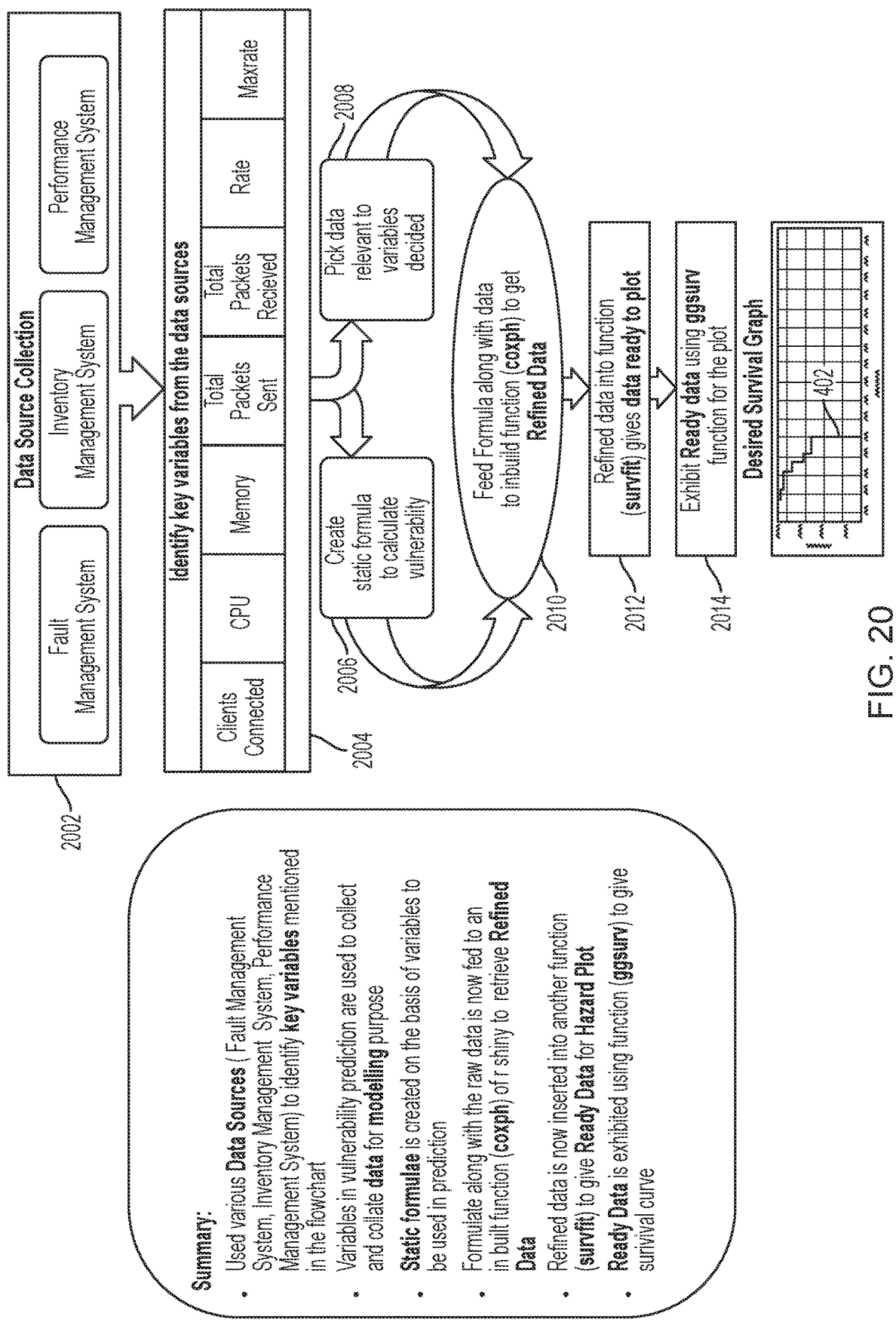
FIG. 20 is a flow diagram of the logic of determining the survivability of a network device and/or of the network devices based on the hazard model.

FIG. 20 is a flow diagram of the logic of determining the survivability of a network device and/or of the network devices 302 based on the hazard model 124. Operations may begin by collecting (2002) data from the data sources 112.

Next, key variables from the data sources 112 may be identified (2004). In this example, the identified key variables are "Clients Connected", "CPU", "Memory", "Total Packets Sent", Total Packets Received", "Rate", and "Maxrate". The variable "Clients Connected" may be the number of clients connected to a network device. For example, the number of client devices may be the number of wireless connections to a wireless router. The variable "CPU" may be the percent of the CPU or the percent of a combination of CPUs that is being used in the network device. The variable "Memory" may be a percent of total memory of the network device. The variable "Total Packets Sent" may be the total number of packets sent by the network device in a predetermined period of time. Similarly, the variable "Total Packets Received" may be the total number of packets received by the network device in a predetermined period of time. The variable "Rate" may be an average rate at which packets are sent by and/or received by the network device. The variable "Maxrate" may be the highest average "Rate" in a predetermined time frame.

A static formula may be created (2006) to calculate vulnerability based on the identified variables. For example, the static formula may be a multivariate hazard function.

Data may be picked (2008) that is relevant to the identified variables. For example, values for each of the identified variables may be selected from the analytical base table data 118. In addition, information related to the identified variables may also be selected from the analytical base table data 118. For example, device identifiers for the network devices 302, geographical locations of the network devices 302, information about services executing on the network devices 302, and/or any other information relevant to the identified variables.

The static formula along with the relevant data from the analytical base table data 118 may be supplied (2010) to a hazard function to generate refined data based on the hazard model 124. The Cox proportional hazards model is one of the most commonly used hazard model. The hazard model 124 investigates the relationship of predictors and the time-to-event through the hazard function. The hazard function assumes that predictors have a multiplicative effect on the hazard and that this effect is constant over time. A programmatic function called coxph( ) which is available in the R programming language, implements the hazard function. The hazard function generates refined data when passed the static formula and the relevant data.

The Cox model assumes proportional hazards between the values of the predictors regardless of how the underlying hazard may change over time. A way around this issue is to fit a stratified Cox model for which the baseline hazard may be different from stratum to stratum or to fit a model that includes time-varying covariates. Accordingly, the stratified Cox model is a good choice for the hazard function, which is used here to predict device survival.

The refined data obtained from the hazard function may be supplied (2012) to a survival analysis function. An example of the survival analysis function is a programmic function called survfit( ) which is available in the R programming language. The survival analysis function generates data representing the survival curve 402 from the refined data for one or more of the network devices 302.

The survival curve 402 may be displayed (2014) by, for example, supplying the data representing the survival curve 402 to a programmatic procedure like ggsurv( ) which is available in the R programming language. The function ggsurv( ) produces Kaplan-Meier plots.

Figure 21:
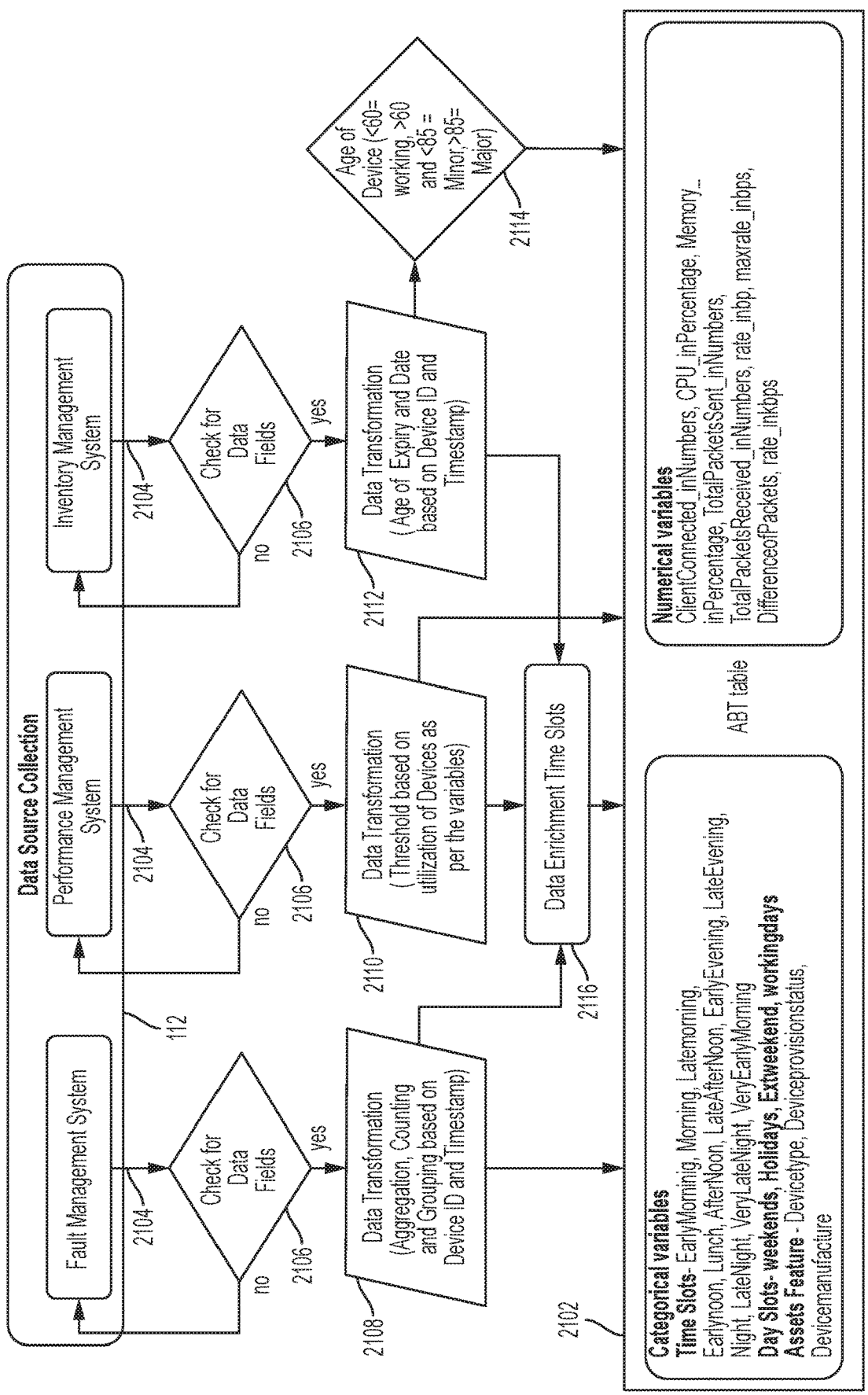
FIG. 21 is a flow diagram of example logic for populating an analytical base table with the analytical base table data.

FIG. 21 is a flow diagram of example logic for populating an analytical base table 2102 with the analytical base table data 118. The analytical base table 2102 (ABT) is a penultimate table which is statistically correct to be submitted for analytical modelling. The ABT 2102 may include one or more tables created from one or more translation tables that include simulated data. This is the final table that is used for conducting detailed analysis.

Operations may start by, for example, obtaining (2104) raw data from the data sources 112. The data obtained includes information on device faults, device performance, device configuration and compliance, device inventory, and trouble tickets.

Information on device faults includes device outages data that provides information about outages that occurred on or with the network device. Outages may include outright failures as well as situations where the network device was technically operational but operated below a threshold performance level. Information on device performance includes device level data, which describes the behavior of one or more performance metrics of the network device. Information on device configuration and compliance includes device level information about any configuration changes that may have occurred over a time period and a compliancy status according to organization policy. Information on device inventory details about network inventory. Information on trouble tickets includes historical information about any trouble or problem that may have occurred in the network 304.

The system 100 may check (2106) for data fields from the data sources 112. The data fields checked may be the data fields that correspond to the variables identified for data modeling. Alternatively or in addition, the data fields checked may be the data fields that may have impact on the vulnerability of the network device.

The variables include categorical variables and numerical variables. Numeric variable are variables that directly impact the network devices 302. Categorical variables may be variables that are used to learn the behavior of a numerical variable over a time period.

The categorical variables relate to time slots, day slots, and asset features. The categorical variables for time slots may include: EarlyMorning, Morning, LateMorning, EarlyNoon, Lunch, AfterNoon, LateAfterNoon, EarlyEvening, LateEvening, Night, LateNight, VeryLateNight, and VeryEarlyMorning. The categorical variables for day slots include: Weekends, Holidays, Extweekend, Workingdays. The categorical variables for asset features may include: Devicetype, Deviceprovisionstatus, and Devicemanufacturer.

The numerical variables may include: Clients-Connected_inNumbers, CPU_inPercentage, Memory_inPercentage, TotalPacketsSent_inNumbers, TotalPacketsReceived_inNumbers, rate_inbps, maxrate_inbps, DifferenceofPackets, rate_inKbps. The variable rate_inbps is a rate of incoming packets in bytes per seconds. The variable maxrate_inbps is a maximum value of incoming packets in bytes per second. The variable DifferenceofPackets is a difference between incoming and outgoing packets. The variable rate_inKbps is a rate of incoming packets in Kilobytes per second.

In view of the above-identified variables, the data fields selected be obtained from the data sources 112 may include related data fields that may have impact on the vulnerability of the network device. Such data fields may be related to asset data, performance data, and fault data. In particular, the data fields related to asset data may include: Devicetype, Deviceprovisionstatus, Devicemanufacture, CommissionedDate, and EndOfLife. The data fields related to performance data may include: ClientConnected_inNumbers, CPU_inPercentage, Memory_inPercentage, TotalPacketsSent_inNumbers, TotalPacketsReceived_inNumbers, rate_inbps, maxrate_inbps, DifferenceofPackets, and rate_inKbps. The data fields related to fault data may include: FailureInstances, Severity, Device_id, Failure_Day, and event.

The data fields related to time variant data categorization that may also be obtained from the data sources 112. Such data fields may include: Dates, Times, Weeknumbers, weekends, Holidays, ExtWeekend, WorkingDays, EarlyMorning, Morning, LateMorning, EarlyNoon, Lunch, AfterNoon, LateAfterNoon, EarlyEvening, LateEvening, Night, LateNight, VeryLateNight, VeryEarlyMorning, DaySlot, and TimeSlot. Some of the data fields may be derived fields, such as DaySlot and TimeSlot, which may be populated when transforming into the ABT 2102.

Accordingly, the above-identified data fields may be checked (2106) for values to ingest into the ABT 2102. Next, the fault data may transformed (2108). For example, the fault data may be aggregated, counted, and grouped based on device ID (identifier) and timestamp.

The performance data may be transformed (2110). For example, the data may be filtered according to a threshold utilization corresponding to one or more of the performance variables. For example, while transforming (2110) the performance data, values for each variable may be checked to see if the values exceed a threshold corresponding to the respective variable. For example a threshold for the percentage of CPU utilization may be 90 percent. If the values exceed the threshold corresponding to the respective variable, than an entry in the data may be added to indicate that the threshold is exceeded.

The asset data may be transformed (2112). For example, an age of expiry and data may be generated based on device ID and timestamp. In addition, a status of the network device, such as "Working", "Minor", or "Major", may be determined (2114) based on the from the age of expiry. For example, if the age is less than 60 days, then the status is "Working", greater than 60 days and less than 85 days then the status is "Minor", or greater than 85 and the status is "Major". The status of the network device may indicate a date on which the network device was first provisioned in the network 304. The age of the network device may be the current data minus the first provided date.

The logic may end, for example, by enriching (2116) the data from the data sources 112 to identify the time slots and/or day slots. The ingested, transformed, and enriched data may form the analytical base table data 118 that is stored in the ABT 2102.

The above-identified variables and data fields are examples. In other examples, the variables and data fields selected may have different names. Alternatively or in addition, the variables and data fields selected may have different content than described above.

Whenever an outage or an alarm is reported into one of the data sources 112, such as the fault management system, the contributing and/or impacting factors may be taken into consideration that resulted in the outage being reported for the network 304 or for any of the network devices 302 belonging to the network 304. As indicated earlier above, the contributing factors may include, for example, performance management system data, inventory management system data, network topological system data, configuration data, and/or compliance management system data. Updates to the data from the data sources 112 may be obtained by one or more data adapters, which may continuously poll the data sources 112 for changes.

Figure 22:
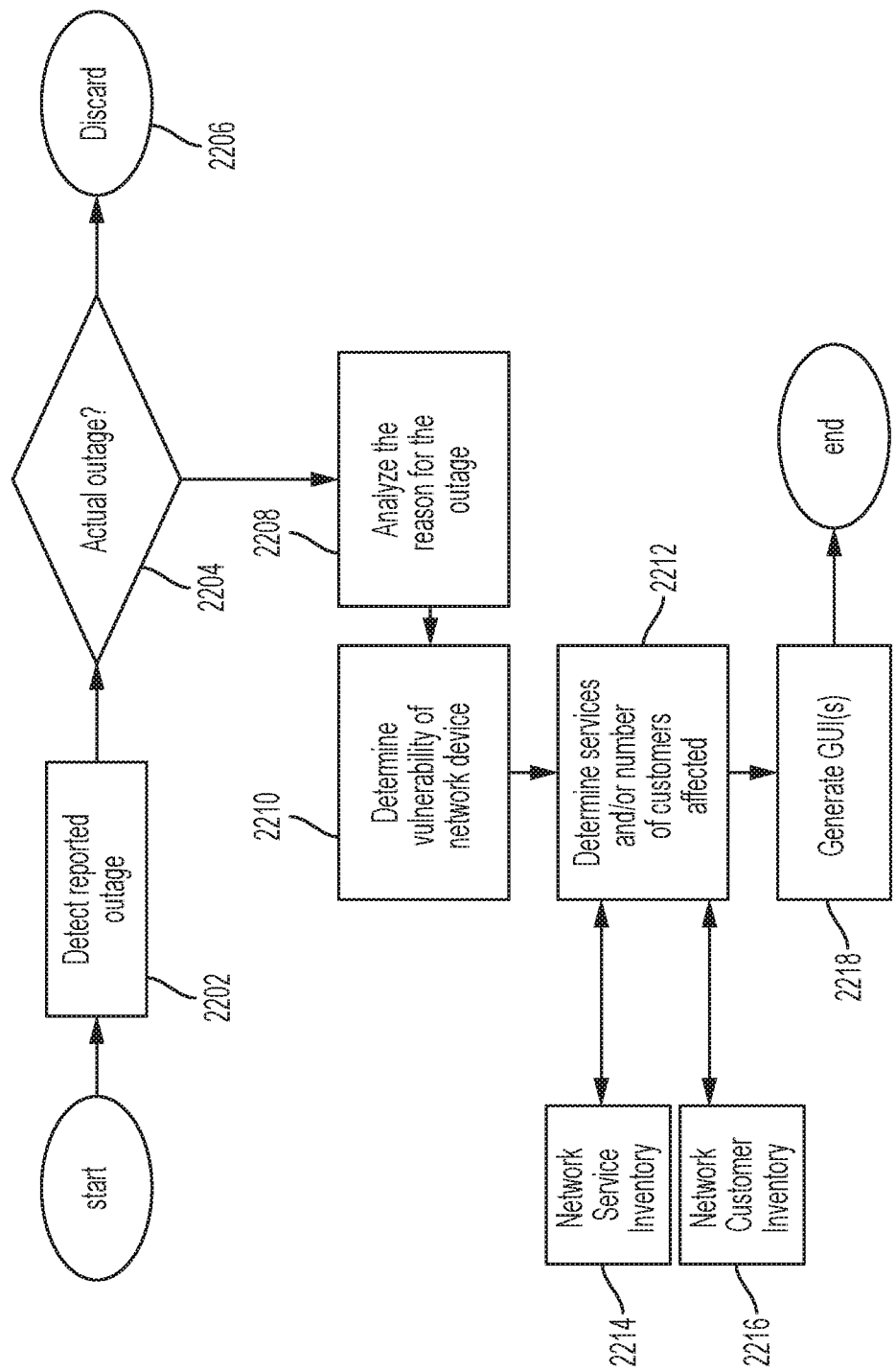
FIG. 22 is a flow diagram of example logic for handling a report of new outage.

FIG. 22 is a flow diagram of example logic for handling a report of new outage. Operations may begin by detecting (2202) that an outage has been reported. The reported outage may be a report of an outage of the network 304 or of a network device on the network. In some examples, the outage reported may be related to a network performance issue for a particular device or group of devices belonging to the network 304.

The system 100 may determine (2204) whether or not the reported outage is an actual outage. An outage that has been verified by a network operator may be considered to be an actual outage. For example, a potential outage may occur in a network device, which is then automatically reported into a fault management system. In reviewing the reported potential outage, the network operator may decide to create a ticket in an incident management system for a field engineer to investigate the reported potential outage. Alternatively, the network operator may determine that the automatically reported outage does not warrant being resolved by a field engineer and, as a result, may not create a ticket. After the field engineer acts upon the ticket assigned to him or her, then he or she may update the resolution notes on the ticket. The updates in the field notes may be broadly categorized as either "actual outage has occurred" or "no trouble found". The former is considered an actual outage and the latter is not.

If the reported outage is determined not to be an actual outage or if the outage is a duplicate, then the reported outage may be discarded (2206). Alternatively, if the reported outage is determined to be an actual outage (and not a duplicate), then operations may continue by analyzing (2208) the reason for the network outage. For example, the prediction engine 120 may analyze the outage type being reported. In particular, the data from the performance management system may be analyzed for the topology of network or devices belonging to the network that reported the outage. Each of the impacting factors that may have affected the performance attribute of the network device is analyzed for any abnormality or anomaly. An abnormality or anomaly may occur when a value of the factor exceeds a predetermined threshold for that factor. Each performance factor is again analyzed for its related performance indicators or attributes that led to anomaly. For example, when there is an anomaly related to CPU percentage utilization data, this anomaly may be attributed to high memory utilization of the network device. Furthermore, high memory utilization may be related to a large number of clients connected to the network device or host processes executing on the network device. Such findings may help the prediction engine 120 to infer that each factor impacting the performance of the network 304 or the network device(s) is inter-related or co-related and is part of the reason for the outage. The prediction engine 120 or different portion of the code framework 108 may perform the analysis (2208) of the reason for the network outage and identify each factor impacting the performance of the network 304 or the network device.

Similarly, the anomaly in performance indicators or attributes of the network devices 302 and/or the network 304 may also be attributed to recent device configuration. Hence, any trend in data regarding device configuration or any anomaly detected in configuration management data in relation to the performance attribute may be investigated. An anomaly in the performance indicator may also be attributed to network device topology. For example, if network connectivity between two of the network devices 302 or between any number of connected devices in the network 304 gets disrupted, then that could lead to anomaly in a device performance indicator. For example, as a result of the disruption, any application process responsible for network connectivity on the network device may consume a high percentage of CPU. Alternatively or in addition, as a result of the disruption, a high number of zombie process may be executing on that the network device.

Next, the vulnerability of the network device may determined (2210) based on a survival analysis as described above. For example, the vulnerability of the network device along with the vulnerability of all or a subset of the network devices 302 in the network 304 may be determined A list of network services that would be susceptible to degradation and/or fail due to a failure of any respective one of the network devices 302 may be determined (2212). For example, a list of services executing on each of the network devices may be obtained from a network service inventory 2214.

Alternatively or in addition, the number of customers that may be affected by a failure of any respective one of the network devices 302 may be determined (2212). For example, the number of customers using each of the services executing on each of the network devices 302 may be obtained from a network customer inventory 2216.

Operations may end, for example, by generating one or more graphical user interfaces (GUIs) for display of device survivability information. Examples of such GUIs are shown in FIGS. 3 to 19.

Alternatively or in addition, operations may continue by collecting data from the data sources 112 at regular or determined intervals and at each interval, handling any newly reported outage by returning to detecting (2202) that an outage has been reported.

The logic shown in the flow diagrams may include additional, different, or fewer operations than illustrated. Alternatively or in addition, the operations may be executed in a different order than illustrated.

The system 100 may be implemented with additional, different, or fewer components than illustrated in FIG. 1. For example, the system 100 may include client machines, such as mobile devices which generate and/or display GUIs. In another example, the system 100 may only include the memory 102 with the code framework 108, whereas the GUI framework 110 the processor 104 and the display device 106 may be included outside of the system 100. In some examples, the system 100 may not include the data sources 112.

The processor 104 may be in communication with the memory 102. In one example, the processor 104 may also be in communication with additional elements, such as a network interface. Examples of the processor 410 may include a general processor, a central processing unit, a microcontroller, a server, an application specific integrated circuit (ASIC), a digital signal processor, a field programmable gate array (FPGA), a set of CPUs distributed across multiple network nodes, a digital circuit, and/or an analog circuit.

The processor 104 may be one or more devices operable to execute logic. The logic may include computer executable instructions or computer code embodied in the memory 102 or in other memory that when executed by the processor 104, cause the processor to perform the features implemented by the logic. The computer code may include instructions executable with the processor 104.

The memory 102 may be any device for storing and retrieving data or any combination thereof. The memory 102 may include non-volatile and/or volatile memory, such as a random access memory (RAM), a read-only memory (ROM), an erasable programmable read-only memory (EPROM), or flash memory. Alternatively or in addition, the memory 102 may include an optical, magnetic (hard-drive) or any other form of data storage device.

The display device 106 may be any electro-optical device for displaying data. Examples of the display device 106 may include a liquid crystal display (LCD), an organic light-emitting diode (OLED), a cathode ray tube (CRT), an electro-luminescent display, a plasma display panel (PDP), a vacuum florescent display (VFD), a touch screen or any other type of display device.

The network 304 may include any collection of transmission links over which data between computing devices or nodes may be exchanged. For example, the network 304 may include a telecommunications network, a local area network (LAN), a wired network, a wireless network, a wireless local area network (WLAN), a WI-FI® network (WI-FI is a registered trademark of Wireless Ethernet Compatibility Alliance, Inc. of Austin, Tex.), a personal area network (PAN), a wide area network (WAN), the Internet, an Internet Protocol (IP) network, any other communications network, or any combination thereof.

Each of the network devices 302 may be any computing device that is connected to or configured to connect to the network 304. Examples of the network devices 302 may include a router, a network switch, a hub, a repeater, a wireless router, a modem, a cable modem, a laptop, a server, a virtual machine, and a mobile device.

Each component may include additional, different, or fewer components. For example, the memory 102 may include the code framework 108 but not the GUI framework 110. As another example, the code framework 108 may include the prediction engine 120 but not the other components shown in FIG. 1.

The system 100 may be implemented in many different ways. Each component, such as the prediction engine 120, the code framework 108, and the GUI framework, may be hardware or a combination of hardware and software. For example, each component may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each component may include memory hardware, such as a portion of the memory 102, for example, that comprises instructions executable with the processor 104 or other processor to implement one or more of the features of the component. When any one of the components includes the portion of the memory that comprises instructions executable with the processor, the component may or may not include the processor. In some examples, each component may just be the portion of the memory 102 or other physical memory that comprises instructions executable with the processor 104 or other processor to implement the features of the corresponding component without the component including any other hardware. Because each component includes at least some hardware even when the included hardware comprises software, each component may be interchangeably referred to as a hardware component.

Some features are shown stored in a computer readable storage medium (for example, as logic implemented as computer executable instructions or as data structures in memory). All or part of the system 100 and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device. However, the computer readable storage medium is not a transitory transmission medium for propagating signals.

The processing capability of the system 100 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

All of the discussion, regardless of the particular implementation described, is exemplary in nature, rather than limiting. For example, although selected aspects, features, or components of the implementations are depicted as being stored in memories, all or part of the system or systems may be stored on, distributed across, or read from other computer readable storage media, for example, secondary storage devices such as hard disks, flash memory drives, floppy disks, and CD-ROMs. Moreover, each of the various components and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system.

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same program or apparatus. The components may be resident on separate hardware, such as separate removable circuit boards, or share common hardware, such as a same memory and processor for implementing instructions from the memory. Programs may be parts of a single program, separate programs, or distributed across several memories and processors.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:

1. A system comprising:
a hardware processor configured to:
determine if a network device outage is deemed by a human to be an actual outage;
generate a proportional hazards model from a data set of factors that contribute to network vulnerability to identify patterns in a plurality of variables from the data set, wherein the network device outage is discarded or ignored with respect to generation of the proportional hazards model if the network device outage was determined not to be an actual outage;
predict a vulnerability of a network device based on a survival analysis performed by a passing of the variables to the proportional hazards model, the vulnerability of the network device including a time it will take for an outage of the network device to occur; and
cause the vulnerability of the network device to be displayed as a three-dimensional scatter plot on which a plurality of points are plotted, the three-dimensional scatter plot having three axes corresponding to three of the variables, and the points indicating if the network device, at a predetermined time in the future, is vulnerable at corresponding values of the variables.

2. The system of claim 1, wherein the processor is further configured to identify one or more services that would be affected by a predicted outage of the network device.

3. The system of claim 1, wherein the processor is further configured to determine a number of customers that would be affected by a predicted outage of the network device.

4. The system of claim 1, wherein the processor is further configured to determine a cause of the network device outage based on an anomaly in a performance indicator.

5. The system of claim 1, wherein the processor is further configured to determine a cause of the network device outage based on an anomaly in configuration data.

6. The system of claim 1, wherein the survival analysis is performed on data collected from at least a fault management system and a performance management system.

7. The system of claim 1, wherein the variables include a number of clients connected to the network device, a percentage of usage of a CPU of the network device, a percentage usage of memory, a total number of packets sent from the network device, a total number of packets received by the network device, a rate of receipt of packets, and a maximum rate of receipt of packets.

8. A system comprising:
an adapter configured to determine if a network device outage is an actual outage based on an indication that a human confirmed the network device outage was an actual outage;
a prediction engine configured to generate a proportional hazards model from a data set of factors that contribute to network vulnerability for identification of patterns in a plurality of variables from the data set, wherein the network device outage is discarded or ignored with respect to generation of the proportional hazards model in response to a determination the network device outage was not an actual outage, and wherein the prediction engine is further configured to predict a vulnerability of a network device based on a survival analysis in which the variables are passed to the proportional hazards model, the vulnerability of the network device including a time it will take for an outage of the network device to occur; and
a graphical user interface framework configured to cause the vulnerability of the network device to be displayed as a three-dimensional scatter plot on which a plurality of points are plotted, the three-dimensional scatter plot having three axes corresponding to three of the variables, and the points indicating if the network device, at a predetermined time in the future, is vulnerable at corresponding values of the variables.

9. The system of claim 8 wherein the prediction engine is further configured to identify one or more services that would be affected by a predicted outage of the network device.

10. The system of claim 8 wherein the prediction engine is further configured to determine a number of customers that would be affected by a predicted outage of the network device.

11. The system of claim 8 wherein the prediction engine is further configured to determine a cause of the network device outage based on an anomaly in a performance indicator.

12. The system of claim 8 wherein the prediction engine is further configured to determine a cause of the network device outage based on an anomaly in configuration data.

13. The system of claim 8 wherein the prediction engine is further configured to perform the survival analysis on data collected from at least a fault management system and a performance management system.

14. The system of claim 8, wherein the variables include a number of clients connected to the network device, a percentage of usage of a CPU of the network device, a percentage usage of memory, a total number of packets sent from the network device, a total number of packets received by the network device, a rate of receipt of packets, and a maximum rate of receipt of packets.

15. A method comprising:
determining a network device outage is an actual outage based on an indication that a human confirmed the network device outage was an actual outage;
generating, in order to identify patterns in a plurality of variables from a data set factors that contribute to network vulnerability, a proportional hazards model from the data set of factors that contribute to network vulnerability, wherein the network device outage is discarded or ignored with respect to generation of the proportional hazards model in response to the determination that the network device outage was not an actual outage;
predicting a vulnerability of a network device based on a survival analysis in which the variables are passed to the proportional hazards model, the vulnerability of the network device including a time it will take for an outage of the network device to occur; and
causing the vulnerability of the network device to be displayed as a three-dimensional scatter plot on which a plurality of points are plotted, the three-dimensional scatter plot having three axes corresponding to three of the variables, and the points indicating if the network device, at a predetermined time in the future, is vulnerable at corresponding values of the variables.

16. The method of claim 15 further comprising identifying one or more services that would be affected by an outage of the network device.

17. The method of claim 15 further comprising determining a number of customers that would be affected by the outage of the network device.

18. The method of claim 15 further comprising determining a cause of the network device outage by identifying an anomaly in a performance indicator of the network device.

19. The method of claim 15 further comprising determining a cause of the network device outage by identifying an anomaly in configuration data of the network device.

20. The method of claim 15 wherein the survival analysis is performed on data collected from at least a fault management system and a performance management system.

* * * * *